(12) United States Patent
Mikhaylik et al.

(10) Patent No.: US 12,374,722 B2
(45) Date of Patent: Jul. 29, 2025

(54) ELECTROLYTES FOR LITHIUM BATTERIES

(71) Applicant: Sion Power Corporation, Tucson, AZ (US)

(72) Inventors: Yuriy V. Mikhaylik, Tucson, AZ (US); Igor P. Kovalev, Vail, AZ (US); Alexis Sheffield, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 706 days.

(21) Appl. No.: 17/484,036

(22) Filed: Sep. 24, 2021

(65) Prior Publication Data

US 2022/0115704 A1     Apr. 14, 2022

Related U.S. Application Data

(60) Provisional application No. 63/090,865, filed on Oct. 13, 2020.

(51) Int. Cl.
    *H01M 10/0569*     (2010.01)

(52) U.S. Cl.
    CPC ........... *H01M 10/0569* (2013.01); *H01M 2300/0042* (2013.01)

(58) Field of Classification Search
None
See application file for complete search history.

(56) References Cited

U.S. PATENT DOCUMENTS

| | | |
|---|---|---|
| 5,648,187 A | 7/1997 | Skotheim |
| 5,919,587 A | 7/1999 | Mukherjee et al. |

(Continued)

FOREIGN PATENT DOCUMENTS

| | | |
|---|---|---|
| JP | 4945879 B2 | 6/2012 |
| KR | 100537604 B1 | 12/2005 |

(Continued)

OTHER PUBLICATIONS

International Search Report and Written Opinion for International Application No. PCT/US2021/051881 mailed Jan. 13, 2022.

(Continued)

*Primary Examiner* — Carlos Barcena
(74) *Attorney, Agent, or Firm* — Wolf, Greenfield & Sacks, P.C.

(57) ABSTRACT

The present invention relates generally to lithium batteries, and more specifically, to electrolyte compositions within lithium batteries. Some aspects of the invention are related to an electrolyte for a lithium battery. In some embodiments, the electrolyte comprises a lithium salt, an organic solvent, and an aromatic hydrocarbon solvent that is different from the organic solvent. The aromatic hydrocarbon solvent may have limited solubility in the organic solvent and/or a limited solubility for lithium salt, e.g., such that the aromatic hydrocarbon solvent is capable of inducing phase separation of the electrolyte when present in a certain amount. In one set of embodiments, an electrolyte comprising one or more aromatic hydrocarbon may lead to an enhanced battery cycle life, reduced rate of electrolyte degradation, and improved low temperature performance. The subject matter disclosed herein involves, in some cases, the use of the electrolyte in a lithium battery.

22 Claims, 9 Drawing Sheets

(56) References Cited

U.S. PATENT DOCUMENTS

| | | | |
|---|---|---|---|
| 5,961,672 A | 10/1999 | Skotheim et al. | |
| 6,238,821 B1 | 5/2001 | Mukherjee et al. | |
| 6,733,924 B1 | 5/2004 | Skotheim et al. | |
| 6,797,428 B1 | 9/2004 | Skotheim et al. | |
| 6,855,458 B1* | 2/2005 | Kim | H01M 10/0569 429/330 |
| 6,936,381 B2 | 8/2005 | Skotheim et al. | |
| 7,223,500 B2 | 5/2007 | Noh et al. | |
| 7,247,408 B2 | 7/2007 | Skotheim et al. | |
| 7,688,075 B2 | 3/2010 | Kelley et al. | |
| 7,771,870 B2 | 8/2010 | Affinito et al. | |
| 7,785,730 B2 | 8/2010 | Affinito et al. | |
| 7,939,198 B2 | 5/2011 | Mukherjee et al. | |
| 8,076,024 B2 | 12/2011 | Affinito et al. | |
| 8,084,102 B2 | 12/2011 | Affinito | |
| 8,087,309 B2 | 1/2012 | Kelley et al. | |
| 8,105,717 B2 | 1/2012 | Skotheim et al. | |
| 8,197,971 B2 | 6/2012 | Skotheim et al. | |
| 8,264,205 B2 | 9/2012 | Kopera | |
| 8,338,034 B2 | 12/2012 | Affinito et al. | |
| 8,415,054 B2 | 4/2013 | Skotheim et al. | |
| 8,603,680 B2 | 12/2013 | Affinito et al. | |
| 8,617,748 B2 | 12/2013 | Mikhaylik et al. | |
| 8,623,557 B2 | 1/2014 | Skotheim et al. | |
| 8,728,661 B2 | 5/2014 | Skotheim et al. | |
| 8,753,771 B2 | 6/2014 | Skotheim et al. | |
| 8,871,387 B2 | 10/2014 | Wang et al. | |
| 8,936,870 B2 | 1/2015 | Affinito et al. | |
| 8,968,928 B2 | 3/2015 | Wang et al. | |
| 9,005,311 B2 | 4/2015 | Safont-Sempere et al. | |
| 9,005,809 B2 | 4/2015 | Wilkening et al. | |
| 9,034,421 B2 | 5/2015 | Mikhaylik et al. | |
| 9,040,197 B2 | 5/2015 | Affinito et al. | |
| 9,040,201 B2 | 5/2015 | Affinito et al. | |
| 9,065,149 B2 | 6/2015 | Skotheim et al. | |
| 9,077,041 B2 | 7/2015 | Burnside et al. | |
| 9,105,938 B2 | 8/2015 | Scordilis-Kelley et al. | |
| 9,214,678 B2 | 12/2015 | Mikhaylik | |
| 9,397,342 B2 | 7/2016 | Skotheim et al. | |
| 9,419,274 B2 | 8/2016 | Wilkening et al. | |
| 9,490,478 B2 | 11/2016 | Mikhaylik et al. | |
| 9,531,009 B2 | 12/2016 | Kumaresan et al. | |
| 9,548,492 B2 | 1/2017 | Affinito et al. | |
| 9,559,348 B2 | 1/2017 | Kumaresan et al. | |
| 9,577,243 B2 | 2/2017 | Schmidt et al. | |
| 9,577,267 B2 | 2/2017 | Scordilis-Kelley et al. | |
| 9,653,735 B2 | 5/2017 | Skotheim et al. | |
| 9,653,750 B2 | 5/2017 | Laramie et al. | |
| 9,711,784 B2 | 7/2017 | Kelley et al. | |
| 9,728,768 B2 | 8/2017 | Mikhaylik et al. | |
| 9,735,411 B2 | 8/2017 | Viner et al. | |
| 9,755,268 B2 | 9/2017 | Fleischmann et al. | |
| 9,780,404 B2 | 10/2017 | Scordilis-Kelley et al. | |
| 9,825,328 B2 | 11/2017 | Du et al. | |
| 9,853,287 B2 | 12/2017 | Mikhaylik et al. | |
| 9,947,963 B2 | 4/2018 | Du et al. | |
| 9,994,959 B2 | 6/2018 | Laramie et al. | |
| 9,994,960 B2 | 6/2018 | Laramie et al. | |
| 10,020,479 B2 | 7/2018 | Mikhaylik et al. | |
| 10,020,512 B2 | 7/2018 | Gronwald et al. | |
| 10,050,308 B2 | 8/2018 | Liao et al. | |
| 10,069,135 B2 | 9/2018 | Fleischmann et al. | |
| 10,069,146 B2 | 9/2018 | Skotheim et al. | |
| 10,122,043 B2 | 11/2018 | Du et al. | |
| 10,243,202 B2 | 3/2019 | Fleischmann et al. | |
| 10,312,545 B2 | 6/2019 | Scordilis-Kelley et al. | |
| 10,319,988 B2 | 6/2019 | Kelley et al. | |
| 10,320,027 B2 | 6/2019 | Scordilis-Kelley et al. | |
| 10,320,031 B2 | 6/2019 | Mikhaylik et al. | |
| 10,333,134 B2 | 6/2019 | Mikhaylik et al. | |
| 10,333,149 B2 | 6/2019 | Affinito et al. | |
| 10,388,987 B2 | 8/2019 | Du et al. | |
| 10,461,333 B2 | 10/2019 | Mikhaylik et al. | |
| 10,461,372 B2 | 10/2019 | Laramie et al. | |
| 10,490,796 B2 | 11/2019 | Laramie et al. | |
| 10,535,902 B2 | 1/2020 | Laramie et al. | |
| 10,541,448 B2 | 1/2020 | Mikhaylik et al. | |
| 10,553,893 B2 | 2/2020 | Laramie et al. | |
| 10,573,869 B2 | 2/2020 | Mikhaylik et al. | |
| 10,608,278 B2 | 3/2020 | Liao et al. | |
| 10,629,947 B2 | 4/2020 | Affinito et al. | |
| 10,629,954 B2 | 4/2020 | Mikhaylik et al. | |
| 10,720,648 B2 | 7/2020 | Quero-Mieres et al. | |
| 10,847,833 B2 | 11/2020 | Bunte et al. | |
| 10,862,105 B2 | 12/2020 | Gronwald et al. | |
| 10,868,306 B2 | 12/2020 | Mudalige et al. | |
| 10,879,527 B2 | 12/2020 | Laramie et al. | |
| 10,944,094 B2 | 3/2021 | Liao et al. | |
| 10,965,130 B2 | 3/2021 | Mikhaylik et al. | |
| 10,991,925 B2 | 4/2021 | Wang et al. | |
| 11,024,923 B2 | 6/2021 | Liao et al. | |
| 11,038,178 B2 | 6/2021 | Liao et al. | |
| 11,041,248 B2 | 6/2021 | Laramie et al. | |
| 11,056,728 B2 | 7/2021 | Mikhaylik et al. | |
| 11,088,395 B2 | 8/2021 | Mikhaylik et al. | |
| 11,108,076 B2 | 8/2021 | Scordilis-Kelley et al. | |
| 11,108,077 B2 | 8/2021 | Scordilis-Kelley et al. | |
| 11,121,397 B2 | 9/2021 | Scordilis-Kelley et al. | |
| 11,165,122 B2 | 11/2021 | Laramie et al. | |
| 11,183,690 B2 | 11/2021 | Wang et al. | |
| 2002/0037458 A1* | 3/2002 | Yamaguchi | H01M 10/0567 429/339 |
| 2005/0196672 A1 | 9/2005 | Mukherjee et al. | |
| 2006/0115579 A1 | 6/2006 | Mukherjee et al. | |
| 2007/0148554 A1 | 6/2007 | Abe | |
| 2007/0221265 A1 | 9/2007 | Affinito et al. | |
| 2008/0318128 A1 | 12/2008 | Simoneau et al. | |
| 2009/0035646 A1 | 2/2009 | Mikhaylik et al. | |
| 2009/0055110 A1 | 2/2009 | Kelley et al. | |
| 2009/0246641 A1* | 10/2009 | Deguchi | H01M 10/0525 429/326 |
| 2010/0239914 A1 | 9/2010 | Mikhaylik et al. | |
| 2011/0006738 A1 | 1/2011 | Mikhaylik et al. | |
| 2011/0014524 A1 | 1/2011 | Skotheim et al. | |
| 2011/0068001 A1 | 3/2011 | Affinito et al. | |
| 2011/0070491 A1 | 3/2011 | Campbell et al. | |
| 2011/0070494 A1 | 3/2011 | Campbell et al. | |
| 2011/0076560 A1 | 3/2011 | Scordilis-Kelley et al. | |
| 2011/0159376 A1 | 6/2011 | Skotheim et al. | |
| 2011/0165471 A9 | 7/2011 | Skotheim et al. | |
| 2011/0206992 A1 | 8/2011 | Campbell et al. | |
| 2011/0256450 A1 | 10/2011 | Campbell et al. | |
| 2012/0048729 A1 | 3/2012 | Mikhaylik et al. | |
| 2012/0052339 A1 | 3/2012 | Mikhaylik et al. | |
| 2012/0070746 A1 | 3/2012 | Mikhaylik et al. | |
| 2012/0082872 A1 | 4/2012 | Schmidt et al. | |
| 2012/0082901 A1 | 4/2012 | Schmidt et al. | |
| 2013/0316072 A1 | 11/2013 | Scordilis-Kelley et al. | |
| 2014/0272594 A1 | 9/2014 | Safont Sempere et al. | |
| 2014/0272595 A1 | 9/2014 | Cristadoro et al. | |
| 2015/0162586 A1 | 6/2015 | Fleischmann et al. | |
| 2015/0188194 A1 | 7/2015 | Mikhaylik et al. | |
| 2015/0287986 A1 | 10/2015 | Affinito et al. | |
| 2016/0118638 A1 | 4/2016 | Gronwald et al. | |
| 2016/0118651 A1 | 4/2016 | Kovalev et al. | |
| 2017/0141385 A1 | 5/2017 | Scordilis-Kelley et al. | |
| 2017/0141402 A1 | 5/2017 | Affinito et al. | |
| 2017/0141442 A1 | 5/2017 | Mikhaylik et al. | |
| 2018/0006303 A1 | 1/2018 | Mikhaylik et al. | |
| 2018/0254516 A1 | 9/2018 | Han et al. | |
| 2018/0261820 A1 | 9/2018 | Liao et al. | |
| 2018/0301697 A1 | 10/2018 | Affinito et al. | |
| 2018/0351148 A1 | 12/2018 | Schneider et al. | |
| 2018/0351158 A1 | 12/2018 | Liao et al. | |
| 2018/0375155 A1 | 12/2018 | Liao et al. | |
| 2019/0006699 A1 | 1/2019 | Jones et al. | |
| 2019/0088958 A1 | 3/2019 | Viner et al. | |
| 2019/0229323 A1 | 7/2019 | Mikhaylik et al. | |
| 2019/0267632 A1 | 8/2019 | Affinito et al. | |
| 2020/0044460 A1 | 2/2020 | Mikhaylik et al. | |
| 2020/0099108 A1 | 3/2020 | Laramie et al. | |
| 2020/0185764 A1 | 6/2020 | Liao et al. | |
| 2020/0194822 A1 | 6/2020 | Laramie et al. | |
| 2020/0220146 A1 | 7/2020 | Laramie et al. | |

(56) References Cited

U.S. PATENT DOCUMENTS

| | | |
|---|---|---|
| 2020/0220149 A1 | 7/2020 | Laramie et al. |
| 2020/0220197 A1 | 7/2020 | Laramie et al. |
| 2020/0220205 A1 | 7/2020 | Affinito et al. |
| 2020/0350631 A1 | 11/2020 | Mikhaylik et al. |
| 2020/0373551 A1 | 11/2020 | Milobar et al. |
| 2020/0373578 A1 | 11/2020 | Wang et al. |
| 2020/0395585 A1 | 12/2020 | Laramie et al. |
| 2021/0057753 A1 | 2/2021 | Viner et al. |
| 2021/0135192 A1 | 5/2021 | Gronwald et al. |
| 2021/0135205 A1 | 5/2021 | Laramie et al. |
| 2021/0135297 A1 | 5/2021 | Mikhaylik et al. |
| 2021/0138673 A1 | 5/2021 | Shannon et al. |
| 2021/0151815 A1 | 5/2021 | Milobar et al. |
| 2021/0151816 A1 | 5/2021 | Shayan et al. |
| 2021/0151817 A1 | 5/2021 | Jennings et al. |
| 2021/0151830 A1 | 5/2021 | Shayan et al. |
| 2021/0151839 A1 | 5/2021 | Niedzwiecki et al. |
| 2021/0151840 A1 | 5/2021 | Shayan et al. |
| 2021/0151841 A1 | 5/2021 | Johnson et al. |
| 2021/0193984 A1 | 6/2021 | Laramie et al. |
| 2021/0193985 A1 | 6/2021 | Laramie et al. |
| 2021/0193996 A1 | 6/2021 | Laramie et al. |
| 2021/0194069 A1 | 6/2021 | Hamblin et al. |
| 2021/0218243 A1 | 7/2021 | Hamblin et al. |
| 2021/0249651 A1 | 8/2021 | Laramie et al. |
| 2021/0265610 A1 | 8/2021 | Liao et al. |
| 2021/0328274 A1 | 10/2021 | Mikhaylik et al. |

FOREIGN PATENT DOCUMENTS

| | | |
|---|---|---|
| KR | 2016-0011548 A | 2/2016 |
| KR | 2020-0112732 A | 10/2020 |

OTHER PUBLICATIONS

PCT/US2021/051881, Jan. 13, 2022, International Search Report and Written Opinion.

Gupta et al., Liquid-Liquid Extraction Using the Composition-Induced Phase Separation Process. Ind Eng Chem Res. Jul. 1996;35(7):2360-8.

Lohner et al., Separate Liquids with Salt! Scientific American. Nov. 9, 2017:10 pages.

Reber et al., The Effect of Salts on the Mutual Miscibility of Normal Butyl Alcohol and Water. J Phys Chem. Apr. 1, 1942;46(4):500-15.

* cited by examiner

ELECTROLYTES FOR LITHIUM BATTERIES

RELATED APPLICATIONS

This application claims priority to U.S. Provisional Application No. 63/090,865, filed Oct. 13, 2020, which is incorporated herein by reference in its entirety.

FIELD

The present invention relates generally to lithium batteries, and more specifically, to electrolyte compositions within lithium batteries.

BACKGROUND

There has been considerable interest in recent years in developing high energy density rechargeable Li-ion batteries that use an intercalated lithium compound as the cathode active material. In such cells, current electrolytes are typically based on solutions of lithium salts and carbonate electrolytes. In particular, these electrolytes typically undergo rapid degradation during repeated charge-discharge process. Thus, rechargeable batteries with such electrolytes generally exhibit limited cycle lifetimes. Accordingly, articles and methods for increasing the cycle lifetime and/or other improvements would be beneficial.

SUMMARY

The present invention relates generally to lithium batteries, and more specifically, to electrolyte compositions within lithium batteries. The subject matter disclosed herein involves, in some cases, interrelated products, alternative solutions to a particular problem, and/or a plurality of different uses of one or more systems and/or articles.

In some aspects, an electrolyte for a lithium battery is provided.

In some embodiments, the electrolyte for a lithium battery comprises a lithium salt; an organic solvent; and an aromatic hydrocarbon solvent that is different from the organic solvent, wherein the aromatic hydrocarbon solvent has a formula (I):

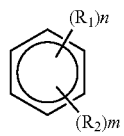

wherein, $R_1$ and $R_2$ can be the same or different and each is independently selected from hydrogen; halogen; unsubstituted, branched or unbranched aliphatic; substituted or unsubstituted, branched or unbranched haloaliphatic; substituted or unsubstituted, branched or unbranched haloheteroaliphatic; substituted or unsubstituted aryl; substituted or unsubstituted haloaryl; substituted or unsubstituted haloheteroaryl; wherein $R_1$ and/or $R_2$ can be substituted, branched or unbranched aliphatic when $R_1$ and $R_2$ are different and are not hydrogen or a nitro group; wherein n and m are integers from 0 to 6, with $n+m \leq 6$; wherein the aromatic hydrocarbon solvent is present at greater than or equal to 10% by weight of the electrolyte.

In some embodiments, the electrolyte for a lithium battery comprises a lithium salt; an organic solvent comprising fluoroethylene carbonate at a concentration greater than 10% by weight of the electrolyte; and an aromatic hydrocarbon solvent that is different from the organic solvent, wherein the aromatic hydrocarbon solvent has a formula (I):

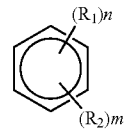

wherein, $R_1$ and $R_2$ can be the same or different and each is independently selected from hydrogen; halogen; unsubstituted, branched or unbranched aliphatic; substituted or unsubstituted, branched or unbranched haloaliphatic; substituted or unsubstituted, branched or unbranched haloheteroaliphatic; substituted or unsubstituted aryl; substituted or unsubstituted haloaryl; substituted or unsubstituted haloheteroaryl; wherein $R_1$ and/or $R_2$ can be substituted, branched or unbranched aliphatic when $R_1$ and $R_2$ are different and are not hydrogen or a nitro group; wherein n and m are integers from 0 to 6, with $n+m \leq 6$.

In some embodiments, the electrolyte for a lithium battery comprises a lithium salt; an organic solvent; and an aromatic hydrocarbon solvent that is different from the organic solvent, wherein the hydrocarbon solvent is present at an amount that deviates no more than 40 wt % with respect to a critical amount of aromatic hydrocarbon solvent in the electrolyte, and wherein the critical amount of aromatic hydrocarbon solvent in the electrolyte is an amount at which the electrolyte phase separates from a single liquid phase into at least two or more liquid phases.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Some aspects of the invention are related to an electrolyte for a lithium battery. In some embodiments, the electrolyte comprises a lithium salt, an organic solvent, and an aromatic hydrocarbon solvent that is different from the organic solvent. The aromatic hydrocarbon solvent may have limited solubility in the organic solvent and/or a limited solubility for lithium salt, e.g., such that the aromatic hydrocarbon solvent is capable of inducing phase separation of the electrolyte when present in a certain amount. In some instances, the aromatic hydrocarbon solvent may be present at greater than or equal to 10% by weight of the electrolyte.

In some embodiments, the presence of one or more selected aromatic hydrocarbon solvents may increase the cycle life of an electrochemical cell, compared to a control electrochemical cell without the aromatic hydrocarbon solvent(s). For instance, the aromatic hydrocarbon solvent may reduce or prevent the organic solvent from undergoing rapid degradation during charge and/or discharge of an electrochemical cell, thereby increasing the cycle life of the electrochemical cell. Additionally, the presence of one or more selected aromatic hydrocarbon solvents may reduce or prevent undesired reactions (e.g., formation of an electrode-electrolyte interphase) between the electrodes and the electrolyte during cycling, thereby increasing cathode and/or anode stability and cycle life. In some such embodiments, the selected aromatic hydrocarbon solvent, when used at an appropriate amount (e.g., greater than or equal to 10%), and/or when used in combination with a selected organic solvent at an appropriate amount (e.g., fluoroethylene carbonate at a concentration greater than 10% by weight of the electrolyte), may increase the cycle life of an electrochemical cell. Advantageously, the presence of one or more selected aromatic hydrocarbons may also lead to improved low temperature performance and fast charge ability of the electrochemical cell.

The electrolyte compositions described herein may be incorporated into various electrochemical cells. In some cases, the electrochemical cell may be a lithium-based electrochemical cell, such as a lithium-sulfur electrochemical cell, a lithium-ion electrochemical cell, a lithium metal lithium-ion electrochemical cell, an intercalated lithium metal oxide electrochemical cell, or an intercalated lithium metal phosphate electrochemical cell.

Figure 1:
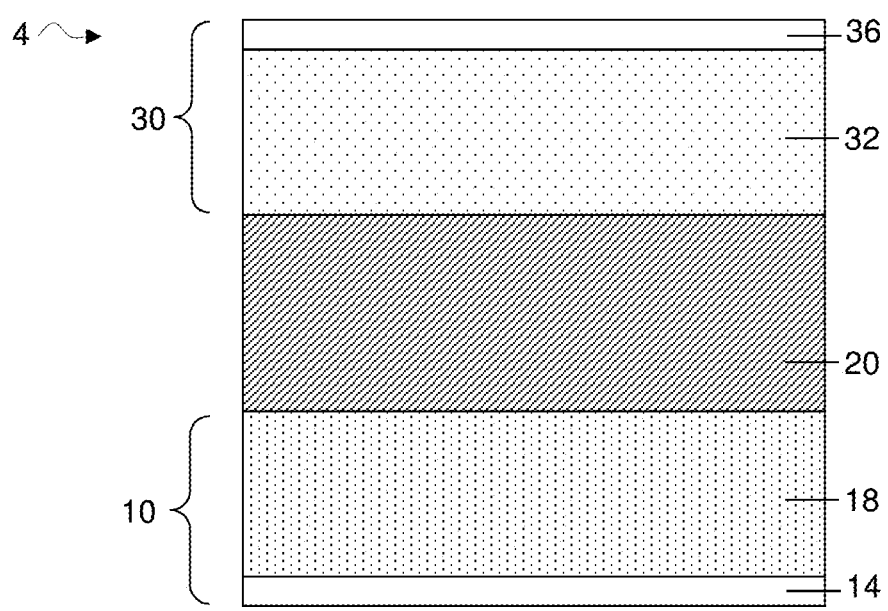
FIG. 1 is a cross-sectional schematic illustration of an electrochemical cell comprising a first electrode comprising an anode, a second electrode comprising a cathode, and a one-phase electrolyte, in accordance with various embodiments.

As noted above, some aspects are related to an electrolyte for a lithium battery comprising a lithium salt, an organic solvent, and an aromatic hydrocarbon solvent that is different from the organic solvent. In some embodiments, the organic solvent may be an organic solvent mixture comprising one or more organic solvents. In some cases, the aromatic hydrocarbon solvent may be an aromatic hydrocarbon solvent mixture comprising one or more of aromatic hydrocarbon solvents. A non-limiting representation of an electrolyte in a lithium battery (e.g., electrochemical cell) is shown in FIG. 1. As shown illustratively in FIG. 1, an electrochemical cell 4 includes a first electrode comprising an anode 18 and an electrolyte 20 disposed between the anode and a second electrode comprising a cathode 32. Electrolyte 20 may comprise a lithium salt, at least one organic solvent, and at least one aromatic hydrocarbon solvent, as described herein.

In some embodiments, a lithium battery comprising an electrolyte composition described herein may exhibit a substantial increase in cycle lifetime. The electrolyte may comprise an aromatic hydrocarbon solvent that is present in any suitable amount in an electrolyte, e.g., such that the battery has an improved cycle life. As used herein, a 'substantial' increase in cycle lifetime may refer to at least 5%, at least 10%, at least 20 wt %, at least 40%, at least 60%, at least 80%, at least 100%, or at least 120% more than the cycle lifetime of a lithium battery comprising an electrolyte without an aromatic hydrocarbon solvent, all other factors being equal. Additionally, in some embodiments, a lithium battery comprising an electrolyte composition described herein may exhibit a decrease in rate of electrolyte degradation (e.g., organic solvent and/or salt, etc.). For instance, in some embodiments, a rate of electrolyte degradation may be at least 5%, at least 10%, at least 20 wt %, at least 40%, at least 50% at least 60%, or at least 80% slower compared to a lithium battery comprising a typical electrolyte without an aromatic hydrocarbon solvent.

Figure 2:
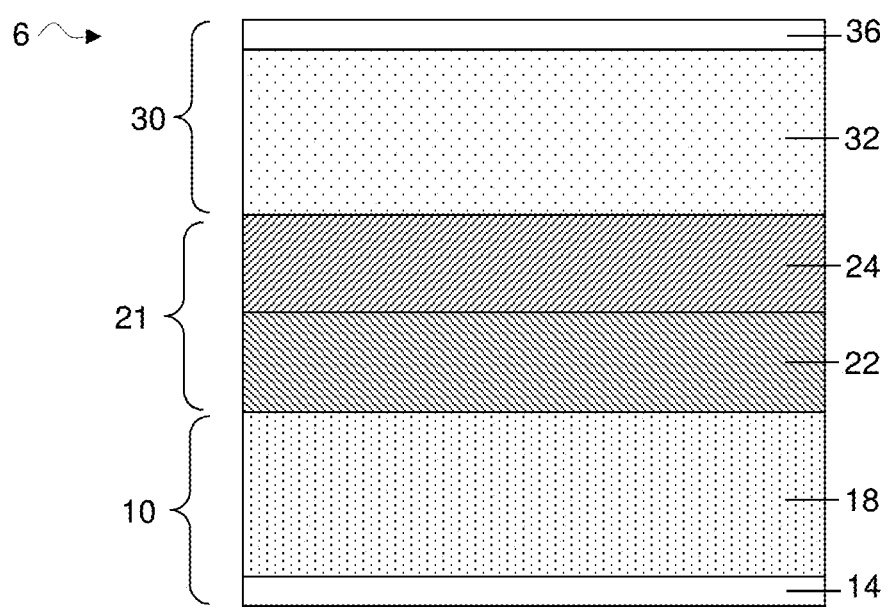
FIG. 2 is a cross-sectional schematic illustration of an electrochemical cell comprising first electrode comprising an anode, a second electrode comprising a cathode, and a two-phase electrolyte, according to some embodiments.

According to some embodiments, the electrolyte may be a homogeneous electrolyte or a heterogeneous electrolyte. A "homogeneous" electrolyte, as described herein, refers to an electrolyte that comprises miscible components and is therefore a 1-phase electrolyte comprising a single liquid phase. For instance, an example of a homogenous electrolyte may comprise a combination of lithium salt, organic solvent, and aromatic hydrocarbon solvent, mixed at a suitable composition where each component is miscible with one another to form a 1-phase electrolyte. Again, referring to FIG. 1, a homogeneous electrolyte 20 comprising a single liquid phase is disposed between the cathode and the anode. According to some embodiments, a homogeneous electrolyte may comprise a particularly beneficial combination of electrolyte species that may result in a substantial increase in cycle lifetime of an electrochemical cell. In some embodiments, a heterogeneous electrolyte may be used in an electrochemical cell, e.g., to increase the cycle lifetime of the electrochemical cell. A "heterogeneous" electrolyte, as described herein, refers to an electrolyte that comprises two or more immiscible phases, e.g., with at least one phase rich in one or more electrolyte components, and at least another phase poor in the one or more electrolyte components. For instance, an example of a heterogeneous electrolyte may comprise a combination of lithium salt, organic solvent, and aromatic hydrocarbon solvent, mixed at a suitable composition where at least one component is partially immiscible with at least one other components. For example, a heterogeneous electrolyte may be a 2-phase electrolyte, as illustrated in a non-limiting representation shown in FIG. 2. As shown illustratively in this figure, electrochemical cell 6 comprises an anode 18 and a heterogeneous (e.g., 2 phases) electrolyte 21 disposed between a cathode 32 and the anode. As shown, the heterogeneous 2-phase electrolyte may comprise two separate liquid layers, e.g., a first layer 24 and a second layer 22, where each layer comprises variable concentrations of a particular electrolyte component (e.g., organic solvent, salt, aromatic hydrocarbon solvent). For instance, the first layer may have a concentration rich in aromatic hydrocarbon solvent and poor in organic solvent and salt, whereas the second layer may have a concentration rich in organic solvent and salt and poor in aromatic hydrocarbon solvent. Although FIG. 2 illustratively shows a heterogeneous electrolyte comprising two separate liquid layers, it should be noted that heterogeneous electrolyte may exist in other configurations. For examples, in one set of embodiments, a heterogeneous electrolyte may exist in the form of an emulsion, e.g., where one liquid phase is dispersed in another liquid phase in the form of droplets.

In some embodiments, the aromatic hydrocarbon solvent has a chemical structure as in formula (I):

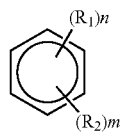

where $R_1$ and $R_2$ can be the same or different and each is independently selected from hydrogen; halogen; unsubstituted, branched or unbranched aliphatic; substituted or unsubstituted, branched or unbranched haloaliphatic; substituted or unsubstituted, branched or unbranched haloheteroaliphatic; substituted or unsubstituted aryl; substituted or unsubstituted haloaryl; substituted or unsubstituted haloheteroaryl; and where n and m are integers from 0 to 6, with $n+m \leq 6$.

In some embodiments, $R_1$ and $R_2$ may be the same or different and each independently selected from hydrogen, halogen, unsubstituted, branched or unbranched aliphatic, substituted or unsubstituted, branched or unbranched haloaliphatic, where n and m are integers from 0 to 6, with $n+m \leq 6$. For instance, the unsubstituted, branched or unbranched aliphatic may comprise a C1-C10 alkyl. In some cases, $R_1$ and/or $R_2$ may be a C1-C10 alkyl. In some embodiments, the substituted or unsubstituted, branched or unbranched haloaliphatic comprises a C1-C10 haloalkyl. In some cases, $R_1$ and/or $R_2$ may be a C1-C10 haloalkyl. In some embodiments, the halogen may comprise one or more of fluorine, bromine, chlorine and iodine. Accordingly, in some cases, $R_1$ and/or $R_2$ may comprise one or more of fluorine, bromine, chlorine, and iodine.

In some embodiments, $R_1$ and/or $R_2$ can be substituted, branched or unbranched aliphatic when $R_1$ and $R_2$ are different and are not hydrogen or a nitro group ($-NO_2$). For instance, in some such embodiments, $R_1$ and/or $R_2$ may be an alkoxy when $R_1$ and $R_2$ are different and are not hydrogen or a nitro group. In one set of embodiments, $R_1$ is an alkoxy group (e.g., methoxy, etc.), and $R_2$ may be a fluorine or fluorine containing group, where n and m are integers from 1 to 6, with $n+m \leq 6$. It should be noted that $R_2$ is not limited to being a fluorine or fluorine containing group, and may have any appropriate chemistry described above that is different from $R_1$ (e.g., such as a haloalkyl, halogen, etc.) and is not a hydrogen. Non-limiting examples of aromatic hydrocarbon solvent are provided elsewhere herein. In some embodiments, the aromatic hydrocarbon of formula I does not include a structure where $R_1$ is an alkoxy and $R_2$ is a hydrogen, where $n \leq 2$. For instance, non-limiting examples of such structures that are excluded include methoxybenzene and dimethoxybenzene. In some embodiments, the hydrocarbon of formula I does not include nitrobenzene, dinitrobenzene, nitrotoluene, dinitrotoluene, and benzonitrile.

In some embodiments, it may be beneficial to select an aromatic hydrocarbon solvent of formula I comprising a $R_1$ and/or $R_2$ that is fluorinated. Examples of such aromatic hydrocarbon solvents include, but is not limited to, fluorobenzenes, difluorobenzenes, trifluorobenzenes, tetrafluorobenzenes, fluorotoluenes, and trifluorotoluenes. In some instances, $R_1$ and $R_2$ may be different. In some such embodiments, $R_1$ comprises a haloalkyl (e.g., $-CF_3$), and $R_2$ comprises a fluorine or fluorine containing group, where n and m are integers from 1 to 6, with $n+m \leq 6$. An example of such an aromatic hydrocarbon may be trifluorotoluene with one or more fluorine or fluorine containing group substituted to the aromatic ring. In one set of embodiments, $R_1$ may be an alkyl group, and $R_2$ may be a fluorine or fluorine containing group, where n and m are integers from 1 to 6, with $n+m \leq 6$. Examples include, but is not limited to, 1-fluoro-2,4-dimethylbenzene, 1,4-difluoro-2,3-dimethylbenzene. Other combinations of $R_1$ and $R_2$ are also possible.

In some embodiments, the aromatic hydrocarbon solvent may be present in any suitable amount, e.g., at greater than or equal to 10% by weight of the electrolyte. Other ranges are possible. In some embodiments, the aromatic hydrocarbon solvent may be present in an amount of at least 0.5 wt %, at least 1 wt %, at least 3 wt %, at least 5 wt %, at least 7 wt %, at least 10 wt %, at least 12 wt %, at least 14 wt %, at least 16 wt %, at least 20 wt %, at least 30 wt %, at least 40 wt %, at least 50 wt %, at least 60 wt %, at least 80 wt % of the electrolyte. In some embodiments, the aromatic hydrocarbon solvent is present in an amount of less than or equal to 90 wt %, less than or equal to 75 wt %, less than or equal to 55 wt %, less than or equal to 45 wt %, less than or equal to 35 wt %, less than or equal to 25 wt %, less than or equal to 15 wt %, less than or equal to 13 wt %, less than or equal to 11 wt %, less than or equal to 9 wt %, less than or equal to 7 wt %, less than or equal to 5 wt %, less than or equal to 3 wt %, less than or equal to 1.5 wt %, or less than or equal to 0.5 wt % of the electrolyte. Combinations of the above-referenced ranges are also possible (e.g., greater than or equal to 10 wt % and less than or equal to 60 wt %, greater than or equal to 20 wt % and less than or equal to 50 wt %). Other ranges are also possible.

In some embodiments, the aromatic hydrocarbon, when used in an amount disclosed above, may lead to improved battery cycle life. For example, in one set of embodiments, when an aromatic hydrocarbon solvent is present in an electrolyte at an amount of at least 10 wt %, the battery may have at least 3% (e.g., at least 5%, at least 10%, at least 30%, at least 50%, at least 70%, at least 100%, etc.) increase in cycle life compared to a battery containing a similar electrolyte but without the aromatic hydrocarbon solvent, all other factors being equal. In another embodiment, when an aromatic hydrocarbon solvent is present in an electrolyte at an amount of at least 20 wt %, the battery may have at least 30% (e.g., at least 40%, at least 50%, at least 70%, at least 90%, at least 100%, etc.) increase in cycle life compared to a battery containing a similar electrolyte but without the aromatic hydrocarbon solvent, all other factors being equal.

Other ranges of aromatic hydrocarbons, as described herein, may also lead to improved cycle life.

In some embodiments, the aromatic hydrocarbon solvent is chosen at least in part based on its ability to dissolve lithium salts. For instance, it may be advantageous to choose an aromatic solvent that has limited solubility for lithium salts. Specifically, the aromatic hydrocarbon solvent may be capable of dissolving less than or equal 5 wt %, less than or equal to 4 wt %, less than or equal to 3 wt %, less than or equal to 2 wt %, less than or equal to 1 wt %, less than or equal to 0.5 wt %, less than or equal to 0.3 wt %, less than or equal to 0.1 wt %, less than or equal to 0.08 wt %, less than or equal to 0.06 wt %, less than or equal to 0.04 wt %, less than or equal to 0.02 wt %, or less than or equal to 0.01 wt % of salt at room temperature (e.g., 20° C. to 22° C.). Any appropriate selection of salt and aromatic hydrocarbon solvent described elsewhere herein is possible. For instance, aromatic hydrocarbon solvents such as benzene, α, α, α-trifluorotoluene and 1,2-difluorobenzene, may be selected based on their ability to solubilize less than or equal to 0.1 wt % of a lithium salt, e.g., LiFSI, at 20° C. In some instances, the aromatic hydrocarbon solvent may have negligible solubility (e.g., <0.01 wt %) for a lithium salt.

In some embodiments, an aromatic hydrocarbon solvent and an organic solvent in an electrolyte are chosen at least in part based on their differential ability to dissolve salts. According to some embodiments, the salt may have a higher solubility in the organic solvent than in the aromatic hydrocarbon solvent. In some embodiments, the salt has a solubility in the organic solvent that is at least 2 times, least 5 times, at least 10 times, at least 15 times, at least 20 times, at least 40 times, at least 60 times, at least 80 times, at least 100 times, at least 200 times, or at least 500 times the solubility in the aromatic hydrocarbon solvent. Any appropriate selection of salt, aromatic hydrocarbon solvent, and organic solvent, as described herein, may be possible. For example, in accordance with some embodiments, for a salt having a specific solubility (e.g., less than or equal to 4 wt % solubility) in an aromatic hydrocarbon solvent, an organic solvent may be selected to have at least 10 times more solubility for the salt, e.g., such as a 40 wt % solubility for the salt. In an exemplary embodiment, an electrolyte comprises an organic solvent (e.g., fluoroethylene carbonate) that is capable of solvating at least 10 times more salt (e.g., LiFSI) than an aromatic hydrocarbon solvent (e.g., benzene, α, α, α-trifluorotoluene, or 1,2-difluorobenzene, toluene, fluorobenzene, tert-butylbenzene, etc.) in the electrolyte.

In some embodiments, the aromatic hydrocarbon solvent is chosen at least in part based on an organic solvent to aromatic hydrocarbon solvent ratio. As mentioned, the organic solvent may comprise a single organic solvent or a mixture of organic solvents. In some embodiments, the organic solvent to aromatic hydrocarbon solvent weight ratio may be greater than or equal to 10 wt %:90 wt % (e.g., 12 wt %:88 wt %), greater than or equal to 20 wt %:80 wt %, greater than or equal to 40 wt %:60 wt %, greater than or equal to 50 wt %:50 wt %, greater than or equal to 60 wt %:40 wt %, greater than or equal to 80 wt %:20 wt %, or greater than or equal to 90 wt %:10 wt %. In some embodiments, the organic solvent to aromatic hydrocarbon weight ratio may be less than or equal to 99.9 wt %:0.1 wt %, less than or equal to 99.5 wt %:0.5 wt %, less than or equal to 95 wt %:5 wt %, less than or equal to 90 wt %:10 wt %, less than or equal to 70 wt %:30 wt %, or less than or equal to 50 wt %:50 wt %, less than or equal to 30 wt %:70 wt %, or less than or equal to 10 wt %:90 wt %. Combinations of the above-referenced ranges are also possible (e.g., greater than or equal to 20 wt % to 80 wt % and less than or equal to 99.5 wt % to 0.5 wt %, or greater than or equal to 40 wt % to 60 wt % and less than or equal to 99.5 wt % to 0.5 wt %). Other ranges are also possible.

In some embodiments, the aromatic hydrocarbon solvent may be selected at least in part based on its polarity, e.g., dielectric constant and/or dipole moment. For instance, in some embodiments, the selected aromatic hydrocarbon solvent may comprise a dielectric constant of at least 1, at least 2, at least 5, at least 10, or at least 15. In some embodiments, the selected aromatic hydrocarbon solvent may comprise a dielectric constant of no more than 20, no more than 15, no more than 10, no more than 8, no more than 6, no more than 4, or no more than 3. Combinations of the above-referenced ranges are also possible (e.g., at least 2 and no more than 10). Other ranges are also possible. For instance, examples of aromatic hydrocarbon with dielectric constant that fall within the above ranges include, but is not limited to, benzene, tert-butyl benzene, toluene, α, α, α-trifluorotoluene, fluorobenzene, 1,2-difluorobenzene, 1,3-difluorobenzene, 1,4-difluorobenzene.

In some embodiments, the presence of aromatic hydrocarbon solvent may help prevent degradation of the organic solvent in the electrolyte. In one set of embodiments, the presence of an aromatic hydrocarbon (e.g., α, α, α-trifluorotoluene, benzene, 1,2-difluorobenzene, toluene, fluorobenzene, tert-butylbenzene, etc.) in an electrolyte results in a lower degradation rate of an organic solvent (e.g., fluoroethylene) in the electrolyte, compared to an electrolyte without the aromatic hydrocarbon solvent, all other factors being equal.

In some embodiments, the aromatic hydrocarbon solvent comprises one or more of benzene, fluorobenzene, tert-butylbenzene, toluene, α, α, α-trifluorotoluene, difluorobenzene, trifluorobenzene, tetrafluorobenzene, and fluorotoluene. Other non-limiting examples of one or more aromatic hydrocarbon solvents that may be included in the electrolyte include chlorobenzenes, dichlorobenzenes (e.g., 1,2-dichlorobenzene/1,3-dichlorobenzene/1,4-dichlorobenzene), trichlorobenzenes (e.g., 1,2,3-trichlorobenzene/1,2,4-trichlorobenzene), iodobenzene, diiodobenzenes (e.g., 1,2-diiodobenzene/1,3-diiodobenzene/1,4-dichlorobenzene), triiodobenzenes (e.g., 1,2,3-triiodobenzene/1,2,4-triiodobenzene), fluorobenzenes, difluorobenzenes (e.g., 1,2-difluorobenzene/1,3-difluorobenzene/1,4-difluorobenzene), trifluorobenzenes (e.g., 1,2,3-trifluorobenzene/1,2,4-trifluorobenzene), tetrafluorobenzenes (e.g., 1,2,3,4-tetrafluorobenzene, 1,2,3,5-tetrafluorobenzene), fluorotoluenes, diflurotoluenes (e.g., 1,2-difluorotoluene/1,3-difluorotoluene/1,4-difluorotoluene), triflurotoluenes (e.g., 1,2,3-trifluorotoluene/1,2,4-trifluorotoluene), chlorotoluenes, dichlorotoluenes (e.g., 1,2-dichlorotoluene/1,3-dichlorotoluene/1,4-dichlorotoluene), trichlorotoluenes (e.g., 1,2,3-trichlorotoluene/1,2,4-trichlorotoluene), iodotoluenes, diiodotoluenes (e.g., 1,2-diiodotoluene/1,3-diiodotoluene/1,4-diiodoluene), triiodotoluenes (e.g., 1,2,3-triiodotoluene/1,2,4-tiiodotoluene), xylene.

In some embodiments, the one or more organic solvents are chosen at least in part by their ability to dissolve lithium salt. In some instances, the organic solvent may dissolve a sufficient amount of salt to achieve a desired ion conductivity in an electrochemical cell. In some embodiments, a lithium salt may be dissolved at a concentration of greater than or equal to 0.1 M, greater than or equal to 0.2 M, greater than or equal to 0.5 M, greater than or equal to 1 M, greater than or equal to 2 M, or greater than or equal to 5 M, in the organic solvent. In some embodiments, the lithium salt may be capable of being dissolved in the electrolyte at a concentration of less than or equal to 10 M, less than or equal to 5 M, less than or equal to 2 M, less than or equal to 1 M, less than or equal to 0.5 M, less than or equal to 0.2 M, or less than or equal to 0.1 M in the organic solvent. Combinations of the above-referenced ranges are also possible (e.g., greater than or equal to 0.1 M and less than or equal to 10 M, or greater than or equal to 0.5 M and less than or equal to 5 M). Other ranges are also possible.

In some embodiments, the organic solvent and the hydrocarbon solvent are chosen at least in part by their total ability to dissolve an appropriate amount of salt, e.g., to impart sufficient ion conductivity to the electrolyte. For instance, a lithium salt may be dissolved at a concentration of greater than or equal to 0.2 M, greater than or equal to 0.5 M, greater than or equal to 1 M, greater than or equal to 2 M, or greater than or equal to 5 M, in the aromatic hydrocarbon solvent and organic solvent. In some embodiments, the lithium salt may be capable of dissolving in the electrolyte at a concentration of less than or equal to 10 M, less than or equal to 5 M, less than or equal to 2 M, less than or equal to 1 M, less than or equal to 0.5 M, less than or equal to 0.2 M, or less than or equal to 0.1 M, in the aromatic hydrocarbon solvent and organic solvent. Combinations of the above-referenced ranges are also possible (e.g., greater than or equal to 0.2 M and less than or equal to 10 M, or greater than or equal to 0.5 M and less than or equal to 5 M). Other ranges are also possible.

In some embodiments, the organic solvent may comprise one or more of carbonate-based solvents, sulfone-based solvents, esters of carboxylic acids, esters of phosphoric acid, linear and cyclic ethers and acetals, esters of sulfuric acids, esters of sulfonic acids, esters formed from carboxylic acids and halogenated alcohols. Additional non-limiting examples of useful organic solvents include, but are not limited to, for example, N-methyl acetamide, acetonitrile, acetals, ketals, esters (e.g., esters of carbonic acid), carbonates (e.g., dimethyl carbonate, diethyl carbonate, ethyl methyl carbonate, propylene carbonate, ethylene carbonate, fluoroethylene carbonate, difluoroethylene carbonate), sulfones, sulfites, sulfolanes, suflonimidies (e.g., bis(trifluoromethane)sulfonimide lithium salt), aliphatic ethers, acyclic ethers, cyclic ethers, glymes, polyethers, phosphate esters (e.g., hexafluorophosphate), siloxanes, dioxolanes, N-alkylpyrrolidones, nitrate containing compounds, substituted forms of the foregoing, and blends thereof. Examples of acyclic ethers that may be used include, but are not limited to, diethyl ether, dipropyl ether, dibutyl ether, dimethoxymethane, trimethoxymethane, 1,2-dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents.

In some embodiments, the organic solvent may comprise one or more of carbonate-based solvents selected from the group of fluoroethylene carbonate, dimethyl carbonate, diethyl carbonate, ethyl methyl carbonate, propylene carbonate, and ethylene carbonate. In some embodiments, the organic solvent may comprise a mixture of fluoroethylene carbonate and dimethyl carbonate. In some such embodiments, the weight-based ratio of fluoroethylene carbonate to dimethyl carbonate (FEC:DMC) in the organic solvent may be, in some cases, greater than or equal to 1:10 (e.g., 1:9), greater than or equal to 1:8, greater than or equal to 1:5, greater than or equal to 1:4, greater than or equal to 1:3, greater than or equal to 1:2, greater than or equal to 1:1, greater than or equal to 2:1, greater than or equal to 3:1, greater than or equal to 5:1, greater than or equal to 10:1, greater than or equal to 30:1, greater than or equal to 50:1, greater than or equal to 70:1, or greater than or equal to 90:1. In some embodiments, the weight-based ratio of fluoroethylene carbonate to dimethyl carbonate may be less than or equal to 100:1, less than or equal to 80:1, less than or equal to 60:1, less than or equal to 40:1, less than or equal to 20:1, less than or equal to 10:1, less than or equal to 6:1, less than or equal to 4:1, less than or equal to 2:1, less than or equal to 1:1, less than or equal to 1:2, less than or equal to 1:3, less than or equal to 1:4, less than or equal to 1:5, less than or equal to 1:7, less than or equal to 1:10. Combinations of the above-referenced ranges are also possible. For instance, a weight ratio of fluoroethylene carbonate and dimethyl carbonate may be greater than or equal to 1:10 and less than or equal to 100:1. In some embodiments, the weight ratio is greater than or equal to 1:4 and less than or equal to 1:3. Other ranges may be possible. In some embodiments, the organic solvent may comprise solely of fluoroethylene carbonate (e.g., an FEC:DMC weight ratio of 100:0). The organic solvent may be included in the electrolyte in one or more of ratios above in combination with a hydrocarbon solvent as described herein.

In some embodiments, mixtures of solvents are selected from the group consisting of 1,3-dioxolane and dimethoxyethane, 1,3-dioxolane and diethyleneglycol dimethyl ether, 1,3-dioxolane and triethyleneglycol dimethyl ether, and 1,3-dioxolane and sulfolane. The weight ratio of the two solvents in the mixtures may range, in some cases, from about 5 wt %: 95 wt % to 95 wt %:5 wt %. In some embodiments, the mixture of solvents comprises dimethyl carbonate and ethylene carbonate. In some embodiments, the mixture of solvents comprises ethylene carbonate and ethyl methyl carbonate. The weight ratio of the two solvents in the mixtures may range, in some cases, from about 5 wt %: 95 wt % to 95 wt %: 5 wt %. For example, in some embodiments the electrolyte comprises a 50 wt %:50 wt % mixture of dimethyl carbonate:ethylene carbonate. In some other embodiments, the electrolyte comprises a 30 wt %:70 wt % mixture of ethylene carbonate:ethyl methyl carbonate. An electrolyte may comprise a mixture of dimethyl carbonate:ethylene carbonate with a ratio of dimethyl carbonate:ethylene carbonate that is less than or equal to 50 wt %:50 wt % and greater than or equal to 30 wt %:70 wt %.

In some embodiments, the organic solvent may comprise fluoroethylene carbonate at any suitable amount described herein. In some embodiments, the organic solvent comprises fluoroethylene carbonate in a concentration of greater than or equal to 5 wt %, greater than or equal to 7 wt %, greater than or equal to 10 wt %, greater than or equal to 12 wt %, greater than or equal to 14 wt %, greater than or equal to 16 wt %, greater than or equal to 18 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, or greater than or equal to 90 wt % of the total weight of the electrolyte. In some embodiments, the total weight of the fluoroethylene carbonate may be less than or equal to 85 wt %, less than or equal to 75 wt %, less than or equal to 65 wt %, less than or equal to 55 wt %, less than or equal to 45 wt %, less than or equal to 35 wt %, less than or equal to 25 wt %, less than or equal to 15 wt %, less than or equal to 13 wt %, less than or equal to 11 wt %, or less than or equal to 9 wt % of the total weight of the electrolyte. Combinations of the above-referenced ranges are also possible (e.g., between 10 wt % and 85 wt %, between 10 wt % and 15 wt %, or between 50 wt % and 85 wt %). Other ranges are also possible. In some embodiments, fluoroethylene carbonate may be used as the sole organic solvent or may be used in combination with other solvents (e.g., dimethyl carbonate) to form a mixed organic solvent, as disclosed elsewhere herein.

In some embodiments, the at least one or more organic solvent may be used in any appropriate amount. In some embodiments, the weight of the at least one or more organic solvent may constitute at least 5 wt %, at least 15 wt %, at least 25 wt %, at least 35 wt %, at least 45 wt %, at least 55 wt %, at least 65 wt %, at least 75 wt %, at least 85 wt %, or at least 95 wt % of the total weight of the electrolyte. In some embodiments, the weight of the at least one or more organic solvent may constitute less than or equal to about 90 wt %, less than or equal to about 80 wt %, less than or equal to about 70 wt %, less than or equal to about 60 wt %, less than or equal to about 50 wt %, less than or equal to about 40 wt %, less than or equal to about 30 wt %, less than or equal to about 20 wt %, or less than or equal to about 10 wt % of the total weight of the electrolyte. Combinations of the above-referenced ranges are also possible (e.g., between 20 wt % to 80 wt %, between 30 wt % and 70 wt %, or between 40 wt % and 60 wt %). Other ranges are also possible.

In some embodiments, the aromatic hydrocarbon solvent is chosen at least in part by its immiscibility with the organic solvent. In some instances, the aromatic hydrocarbon solvent may be immiscible with the organic solvent over a specific compositional window. In some embodiments, it may be beneficial to select a pair of aromatic hydrocarbon and organic solvent that has a potential to become immiscible, i.e., to phase separate or partition, e.g., during cell cycling (charge and/or discharge). In some cases, it may be beneficial to use a pair of aromatic hydrocarbon and organic solvent at or close to a compositional range in which immiscibility occurs, as described elsewhere herein. For instance, an aromatic hydrocarbon solvent (e.g., benzene, fluorobenzene, tert-butylbenzene, toluene, α, α, α-trifluorotoluene, etc.) may be used together with an organic solvent (e.g., fluoroethylene carbonate, etc.), e.g., as these solvents may exhibit immiscibility over a particular compositional range.

In some cases, immiscibility of aromatic hydrocarbon solvent and organic solvent may be induced by the presence of certain solutes (e.g., a salt) dissolved within electrolyte, e.g., as a result of the solute's differential solubility in the aromatic hydrocarbon solvent versus the organic solvent. For instance, a particularly beneficial electrolyte composition may comprise an aromatic hydrocarbon solvent with a limited solubility for a lithium salt compared to the organic solvent, e.g., such that the pair of aromatic hydrocarbon solvent and organic solvent may become immiscible with a change in salt content during charging and/or discharging of the electrochemical cell. For instance, an aromatic hydrocarbon solvent (e.g., benzene, fluorobenzene, tert-butylbenzene, toluene, α, α, α-trifluorotoluene, etc.) that has a limited solubility for a particular salt (e.g., $LiPF_6$, LiFSI, etc.) may be paired with an organic solvent (e.g., fluoroethylene carbonate) that has a higher solubility for said salt. During charging and discharging, a change in salt content may lead to favorable phase separation or partitioning of the solvents due to a change in solvent miscibility, as described in more detail below.

As mentioned, in some embodiments, the aromatic hydrocarbon solvent is partially miscible with the rest of the electrolyte (e.g., organic solvent or solvent mixture containing dissolved lithium salt). An aromatic hydrocarbon solvent that has partial miscibility may have a miscibility that is concentration dependent. For instance, the aromatic hydrocarbon solvent may be miscible with the rest of the electrolyte below a critical amount, after which the aromatic hydrocarbon becomes immiscible and electrolyte undergoes phase transition and subsequently phase separation. For instance, in some such embodiments, the electrolyte remains as a single liquid phase (i.e., a homogeneous electrolyte) when the aromatic hydrocarbon solvent is present at an amount below a critical amount, i.e., an amount at which the electrolyte phase separates from a single liquid phase into at least two or more liquid phases. As discussed previously, FIG. 1 illustratively shows a homogeneous electrolyte 20 comprising a single liquid phase containing an aromatic hydrocarbon solvent below a critical amount. In some such embodiments, the electrolyte phase separates from a single liquid phase into two or more phases (i.e., heterogeneous electrolyte) when the aromatic hydrocarbon solvent is present at amount equal to or above a critical amount. For instance, FIG. 2 shows a non-limiting example of such an embodiment comprising a heterogeneous electrolyte 21 containing two immiscible phases (22 and 24).

Determining immiscibility of two or more components can be carried out by those of ordinary skill in the art. For instance, the determination of a critical amount (i.e., phase transition concentration) of an aromatic hydrocarbon solvent in an electrolyte mixture comprising the aromatic hydrocarbon solvent, an organic solvent, and a salt may be performed experimentally through addition of the aromatic hydrocarbon solvent to the solution of salt in the organic solvent. In some such embodiments, the experiment is performed at atmospheric pressure and room temperature (e.g., 20-22° C.) with a temperature variation of less than or equal to +/−1.0° C. For instance, initially, the aromatic hydrocarbon solvent may be added dropwise to an initially homogeneous solution (e.g., salt dissolved in organic solvent or solvent mixture) under constant stirring (e.g., stirring at over 100 to 300 rpm) to ensure good mixing until the resultant electrolyte becomes visually cloudy or turbid. Accordingly, the turbid electrolyte may phase separate or partition into two or more liquid layers after stirring has stopped. In some instances, the turbidity of the mixture may be measured using a Nephelometer. In some embodiments, the turbidity measurements may be performed immediately after 5-10 s of stirring or shaking the mixture. In some such embodiments, an increase in turbidity or an appearance of two liquid layers in the electrolyte may indicate a phase transition (i.e., immiscibility) of the electrolyte from one single liquid phase of homogeneous liquid into two immiscible liquids or two phases system. Accordingly, a critical amount of aromatic hydrocarbon solvent may be determined when an increase in electrolyte turbidity or an appearance of two or more liquid layers has occurred. For instance, according to some embodiments, a turbidity value increase of greater than 5 to 10 times (e.g., by at least 5 times, at least 6 times, at least 7 times, at least 8 times, at least 9 times, at least 10 times) relative to a starting turbidity value indicates an onset of liquid-liquid phase separation (e.g., immiscibility of the liquids). Accordingly, the amount of aromatic hydrocarbon solvent present in the electrolyte mixture that gives rise to a turbidity value of greater than 5 to 10 times turbidity increase (e.g., by at least 5 times, at least 6 times, at least 7 times, at least 8 times, at least 9 times, at least 10 times) relative to a starting turbidity value may be referred to as a critical amount of aromatic hydrocarbon solvent (i.e., phase transition concentration) described herein. General procedures for determining the phase transition concentration associated with a liquid are described in more detail in "Liquid-Liquid Extraction Using the Composition-Induced Phase Separation Process," in Ind. Eng. Chem. Res., 1996, 35, 2360-2368.

In some embodiments, it may be beneficial to include in an electrolyte an aromatic hydrocarbon in an amount close to that (e.g., having a relatively low deviation) which would cause phase separation with the organic solvent in the electrolyte (e.g., critical amount of aromatic hydrocarbon solvent). For instance, the aromatic hydrocarbon may be present in an electrolyte in an amount that deviates no more than 5 wt %, no more than 7 wt %, no more than 10 wt %, no more than 12 wt %, no more than 15 wt %, no more than 17 wt %, no more than 20 wt %, no more than 25 wt %, no more than 30 wt %, no more than 35 wt %, or no more than 40 wt %, with respect to a critical amount of aromatic hydrocarbon, i.e., an amount that results in phase separation or immiscibility, in the electrolyte.

It should be noted that the percent deviation from the critical amount of aromatic hydrocarbon may either be a positive deviation or a negative deviation. As discussed previously, when the aromatic hydrocarbon solvent is present in an amount that deviates negatively from the critical amount, e.g., such as a −10 wt % deviation, the electrolyte is a homogeneous system containing a single liquid phase. Again, referring to FIG. 1, homogeneous electrolyte 20 (i.e., a single liquid phase) may contain an aromatic hydrocarbon that deviates negatively from the critical concentration of the aromatic hydrocarbon. In some instances, when the aromatic hydrocarbon solvent is present in the electrolyte at amount equal to or above the critical amount, e.g., such as a +10 wt % deviation, the electrolyte may be a heterogeneous electrolyte containing multiple phases. For example, FIG. 2 shows a non-limiting representation of a heterogeneous electrolyte 21 (i.e., two liquid phases) that may contain an aromatic hydrocarbon at an amount that deviates positively from the critical concentration. As mentioned, both a homogenous and heterogeneous electrolyte comprising an aromatic hydrocarbon may be used in an electrochemical cell, e.g., to increase the cell's life cycle.

In accordance with some embodiments, an aromatic hydrocarbon, when used in an electrolyte composition at an amount described herein, may substantially improve cycle life of the battery. For instance, when an aromatic hydrocarbon solvent is present in an electrolyte at an amount that deviates no more than 10 wt % from the critical amount of aromatic hydrocarbon solvent, the battery may exhibit at least 20% (e.g., at least a 30%, at least a 50%, at least 70%, at least a 100%, at least a 120%, at least 150% etc.) increase in cycle life compared to a battery containing a similar electrolyte but without the aromatic hydrocarbon solvent, all other factors being equal. In some embodiments, when an aromatic hydrocarbon solvent is present in an electrolyte at an amount that deviates no more than 30 wt % from the critical amount, the battery may have at least 10% (e.g., at least 15%, at least 20%, at least 40%, at least 60%, at least 80%, etc.) increase in cycle life compared to a battery containing a similar electrolyte but without the aromatic hydrocarbon solvent, all other factors being equal. In yet another embodiment, when an aromatic hydrocarbon solvent is present in an electrolyte at an amount that deviates no more than 40 wt % from the critical amount, the battery may have at least a 2% (e.g., at least a 4%, at least 6%, at least 10%, at least a 20%, at least a 40%, etc.) increase in cycle life compared to a battery containing a similar electrolyte but without the aromatic hydrocarbon solvent, all other factors being equal.

In some embodiments, an increase in cycle life may be associated with an induced electrolyte phase separation during charging and/or discharging in a battery. Without wishing to be bound by theory, the phase separation may help prevent decomposition of the electrolyte and/or electrodes and thus improve cycle life of the battery. As will be described in more detail below, electrolyte phase separation may be associated with a change in miscibility of the organic solvent and the aromatic hydrocarbon solvent during charging and/or discharging of the battery, e.g., as a result of the differential salt solubility between the organic solvent and the aromatic hydrocarbon solvent.

In accordance with some embodiments, without wishing to be bound by theory, an increase in salt concentration in the electrolyte during charge and/or discharge at a location adjacent the cathode or anode of an electrochemical cell may result in a separation of the aromatic hydrocarbon solvent from the organic solvent at that location. For instance, as discussed herein, a salt may have differential solubility in an organic solvent versus an aromatic hydrocarbon solvent. For instance, in some embodiments, the organic solvent may have a higher solubility of the salt compared to the aromatic hydrocarbon solvent. Accordingly, with an increase in salt concentration in the electrolyte during charge or discharge, the differential solubility of the salt in the organic solvent versus the aromatic hydrocarbon solvent may lead to a phase separation of an initially homogenous electrolyte (i.e., a single liquid phase) into a least two phases, e.g., a phase rich in organic solvent, and a phase rich in aromatic hydrocarbon solvent.

Figure 3A:
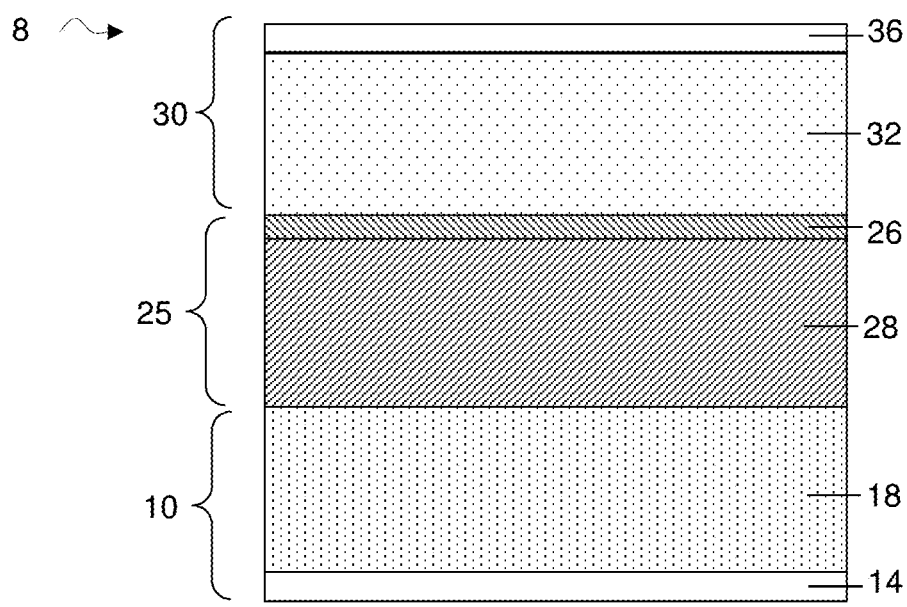
FIG. 3A is a cross-sectional schematic illustration of an electrochemical cell comprising a first electrode comprising an anode, a second electrode comprising a cathode, and an electrolyte depicting the phase separation of the electrolyte during a charging process in accordance with some embodiments.
Figure 3B:
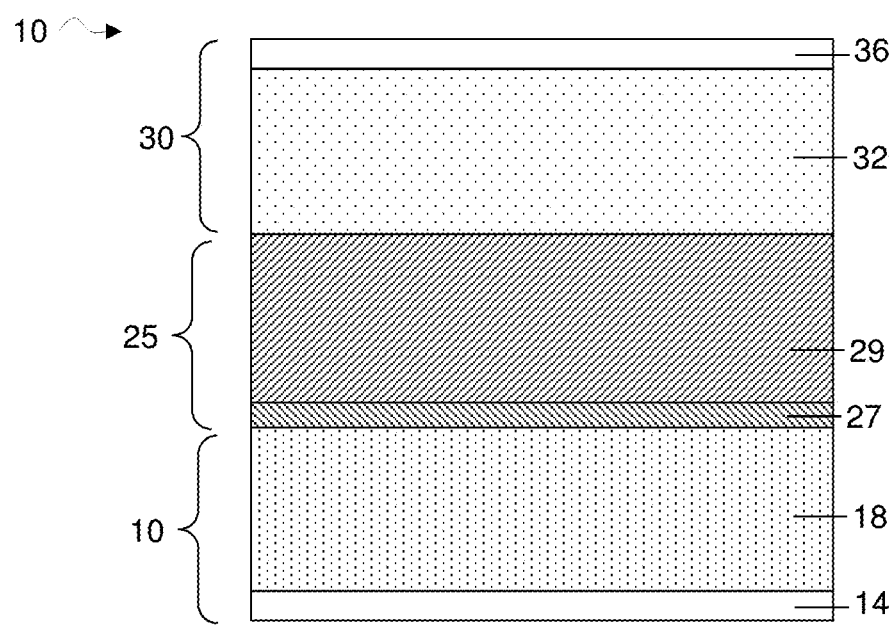
FIG. 3B is a cross-sectional schematic illustration of an electrochemical cell comprising a first electrode comprising an anode, a second electrode comprising a cathode, and an electrolyte depicting the phase separation of the electrolyte during a discharging process in accordance with some embodiments.

A non-limiting representation of the aforementioned embodiment is shown illustratively in FIGS. 3A-3B. As shown in FIG. 3A, during charging, an initially homogeneous electrolyte 25 may experience local phase separation at a location adjacent a cathode 32. The local phase separation may result in the formation of at least two phases 26 and 28, with one phase rich in the organic solvent and the other rich in aromatic hydrocarbon solvent. For instance, in a Li-ion battery, intercalated lithium ions may be dissolved near the cathode during charging, thereby increasing the concentration of lithium ions near the cathode and inducing a local phase separation or solvent immiscibility. Accordingly, in some embodiments, a phase separation near the anode may occur during discharge. As shown illustratively in FIG. 3B, during discharging, local phase separation may occur at a location adjacent an anode 18. The local phase separation may result in the formation of at least two phases 27 and 29, with one phase rich in the organic solvent and the other rich in aromatic hydrocarbon solvent. For instance, in a Li-ion battery, intercalated lithium ions may be released from the anode during discharging, thereby increasing the concentration of lithium ions near the anode and inducing a local phase separation or solvent immiscibility. Without wishing to be bound by theory, the local phase separation, i.e., partitioning of the aromatic hydrocarbon solvent and organic solvent, near the anode and/or cathode may protect the anode and cathode from degradation, reduce the rate of electrolyte degradation (e.g., the degradation of salt and/or solvents), and/or result in improved battery cycle life.

As described herein, in some embodiments, the electrolyte comprises at least one lithium salt. In one set of embodiments, the lithium salt may comprise one or more of lithium hexafluorophosphate ($LiPF_6$), lithium bis(fluorosulfonyl)imide (LiFSI), lithium perchlorate ($LiClO_4$), lithium hexafluoroarsenate ($LiAsF_6$), lithium tetrafluoroborate ($LiBF_4$), lithium trifluromethanesulfonate ($LiCF_3SO_3$), and lithium bis(trifluoromethanesulfonyl)imide (LiTFSI). In other examples, the at least one lithium salt is selected from the group consisting of LiSCN, LiBr, LiI, $LiSO_3CH_3$, $LiNO_3$, $LiPF_6$, $LiBF_4$, $LiB(Ph)_4$, $LiClO_4$, $LiAsF_6$, $Li_2SiF_6$, $LiSbF_6$, $LiAlCl_4$, lithium bis(oxalato)borate, $LiCF_3SO_3$, $LiN(SO_2F)_2$, $LiN(SO_2CF_3)_2$, $LiC(C_nF_{2n+1}SO_2)_3$ wherein n is an integer in the range of from 1 to 20, and $(C_nF_{2+1}SO_2)$ mXLi with n being an integer in the range of from 1 to 20, m being 1 when X is selected from oxygen or sulfur, m being 2 when X is selected from nitrogen or phosphorus, and m being 3 when X is selected from carbon or silicon.

In some embodiments, a lithium salt may be present in the electrolyte at a suitable concentration to impart efficient ion conductivity to the electrolyte within the electrochemical cell. Solubility of salt in the electrolyte can be controlled by tuning the type and amount of the one or more organic solvent and aromatic hydrocarbon solvent. A person of ordinary skill in the art would be able to select the combination and amount of organic solvent/aromatic hydrocarbon solvent/salt to achieve a desired electrolyte conductivity. When present, a lithium salt may be present in the electrolyte at a variety of suitable concentrations. In some embodiments, the lithium salt is present in the electrolyte at a concentration of greater than or equal to 0.01 M, greater than or equal to 0.02 M, greater than or equal to 0.05 M, greater than or equal to 0.1 M, greater than or equal to 0.2 M, greater than or equal to 0.5 M, greater than or equal to 1 M, greater than or equal to 2 M, or greater than or equal to 5 M. The lithium salt may be present in the electrolyte at a concentration of less than or equal to 10 M, less than or equal to 5 M, less than or equal to 2 M, less than or equal to 1 M, less than or equal to 0.5 M, less than or equal to 0.2 M, less than or equal to 0.1 M, less than or equal to 0.05 M, or less than or equal to 0.02 M. Combinations of the above-referenced ranges are also possible (e.g., greater than or equal to 0.01 M and less than or equal to 10 M, or greater than or equal to 0.01 M and less than or equal to 5 M). Other ranges are also possible.

In some embodiments, an electrolyte may comprise $LiPF_6$ and/or LiFSI in an advantageous amount. In some embodiments, the electrolyte comprises LiPF6 and/or LiFSI at a concentration of greater than or equal to 0.01 M, greater than or equal to 0.02 M, greater than or equal to 0.05 M, greater than or equal to 0.1 M, greater than or equal to 0.2 M, greater than or equal to 0.5 M, greater than or equal to 1 M, or greater than or equal to 2 M. The electrolyte may comprise LiPF6 at a concentration of less than or equal to 5 M, less than or equal to 2 M, less than or equal to 1 M, less than or equal to 0.5 M, less than or equal to 0.2 M, less than or equal to 0.1 M, less than or equal to 0.05 M, or less than or equal to 0.02 M. Combinations of the above-referenced ranges are also possible (e.g., greater than or equal to 0.01 M and less than or equal to 5 M, or greater than or equal to 0.5 M and less than or equal to 2 M). Other ranges are also possible.

In some embodiments, an electrolyte may comprise several species together that are particularly beneficial in combination. For instance, a particular combination may lead to slower electrolyte degradation and/or improvement in battery cycle life. In one set of embodiments, the organic solvent comprises a mixture of dimethyl carbonate and fluoroethylene carbonate, and the aromatic hydrocarbon comprises one or more of benzene, fluorobenzene, tert-butylbenzene, toluene, α, α, α-trifluorotoluene. In some cases, the organic solvent may comprise solely fluoroethylene carbonate. Additionally, in some embodiments, the electrolyte comprises a lithium salt (e.g., $LiPF_6$, LiFSI, etc.). Other salts may also be included. A salt may be selected based on its relative solubility in the organic solvent relative to the aromatic hydrocarbon solvent, and/or the absolute solubility in either the organic solvent or the aromatic hydrocarbon solvent, as described elsewhere herein.

In some embodiments, one or more aforementioned species in the combination as described in the previous paragraph may be used in a particularly beneficial amount. For example, as mentioned, the aromatic hydrocarbon solvent may be used in a certain amount (e.g., at least 10 wt % of the electrolyte), or may be used in an amount at a specific ratio with respect to the organic solvent (e.g., at least 20 wt % to 80 wt % of organic solvent to aromatic hydrocarbon solvent), or may be used in an amount that deviates less than a particular wt % (e.g., no more than 10 wt %, no more than 20 wt %, etc.) from a critical amount that induces electrolyte phase transition or immiscibility. For instance, in accordance with some embodiments, when an aromatic hydrocarbon solvent is present in an electrolyte at an amount of at least 10 wt % and/or deviates no more than 30 wt % from a critical amount of aromatic hydrocarbon solvent, the battery may have at least 3% (e.g., at least 5%, at least 10%, at least 30%, at least 50%, at least 70%, at least 100%, etc.) increase in cycle life compared to a battery containing a similar electrolyte but without the aromatic hydrocarbon solvent, all other factors being equal. Other suitable amounts of organic solvent, aromatic hydrocarbon, and salt, as described elsewhere herein, may be used.

In one set of embodiments, a particularly beneficial electrolyte comprises an organic solvent comprising a mixture of dimethyl carbonate and fluoroethylene carbonate, an aromatic hydrocarbon comprising α, α, α-trifluorotoluene and/or benzene, and a lithium salt (e.g., LiPF6, LiFSI, etc.). In some such embodiments, the α, α, α-trifluorotoluene and/or benzene may be present in any appropriate amount (e.g., at least 10 wt %), as disclosed elsewhere herein. In some embodiments, the α, α, α-trifluorotoluene and/or benzene is present at an amount that deviates no more than a particular wt % (e.g., no more than 10%, no more than 20%, or another range described herein) from a critical amount of α, α, α-trifluorotoluene and/or benzene that induces phase separation. For instance, a critical amount of α, α, α-trifluorotoluene that may induce phase separation of the electrolyte may range from 35 wt % to 85 wt % based on the total weight of the electrolyte composition, depending on the electrolyte composition (e.g., salt concentration, relative amounts of dimethyl carbonate to fluoroethylene carbonate in the organic solvent mixture, etc.). For instance, in a specific embodiment, for an organic solvent and salt solution comprising a weight ratio of 9.6 wt %:45.4 wt %:11.8 wt % of LiFSI to fluoroethylene carbonate to dimethyl carbonate, a critical amount of α, α, α-trifluorotoluene that induces phase separation is 36.9 wt % of a total weight of the electrolyte. In some such embodiments, the α, α, α-trifluorotoluene may be present in an amount that deviates no more than 20 wt % from the critical amount, e.g., it may be present in the electrolyte in an amount between 16.9 wt % to 56.9 wt % of the total weight of the electrolyte composition.

In addition to an improved cycle life, the presence of an aromatic hydrocarbon solvent may help retain charge capacity in an electrochemical cell at a relatively low temperature (e.g., less than or equal to 0° C., less than or equal to −25° C., less than or equal to −40° C.). For instance, the retained capacity may be greater than 60%, greater than 70%, greater than 80%, or greater than 90%, at the low temperatures described herein. In some embodiments, the presence of an aromatic hydrocarbon solvent may help the electrochemical cell to retain a high charge efficiency (e.g., at least 80%, at least 90%, at least 95%, at least 99%, etc.) at fast charge (e.g., 4C rate). For instance, the high charge efficiency may be retained over at least 50, at least 60, at least 80, at least 90, or at least 100 cycles.

In some embodiments, a lithium battery comprising an electrolyte described previously is provided herein. Again, referring to FIG. 1, electrochemical cell 4 comprises an anode current collector 14, a first electrode comprising an anode 18 disposed on the anode current collector, electrolyte 20 disposed between the anode and a second electrode comprising a cathode 32, and a cathode current collector 36. Specifics of each components in the electrochemical cell will be discussed below.

Suitable active electrode materials for use in the first electrode (e.g., as an anode active electrode species in an anode of an electrochemical cells described herein) include, but are not limited to, lithium metal such as lithium foil and lithium deposited onto a substrate, and lithium alloys (e.g., lithium-aluminum alloys and lithium-tin alloys). Lithium can be contained as one film or as several films, optionally separated by a protective material such as a ceramic material or an ion conductive material described herein. Suitable ceramic materials include silica-, alumina-, and/or lithium-containing glassy materials such as lithium phosphates, lithium aluminates, lithium silicates, lithium carbonates, lithium oxides, lithium phosphorous oxynitrides, lithium tantalum oxide, lithium aluminosulfides, lithium titanium oxides, lithium silcosulfides, lithium germanosulfides, lithium aluminosulfides, lithium borosulfides, lithium phosphosulfides, and combinations of two or more of the preceding. Suitable lithium alloys for use in the embodiments described herein can include alloys of lithium and aluminum, magnesium, silicium (silicon), indium, silver, and/or tin. While these materials may be preferred in some embodiments, other cell chemistries are also contemplated. In some embodiments, the first electrode may comprise one or more binder materials (e.g., polymers, etc.).

In some embodiments, the thickness of the first electrode (e.g., an anode) may vary from, e.g., about 1 to about 200 microns. For instance, the first electrode (e.g., an anode) may have a thickness of less than about 200 microns, less than about 100 microns, less than about 50 microns, less than about 25 microns, less than about 10 microns, or less than about 5 microns. In some embodiments, the first electrode (e.g., an anode) may have a thickness of greater than or equal to about 1 micron, greater than or equal to about 5 microns, greater than or equal to about 10 microns, greater than or equal to about 25 microns, greater than or equal to about 50 microns, greater than or equal to about 100 microns, or greater than or equal to about 150 microns. Combinations of the above-referenced ranges are also possible (e.g., between about 1 micron and about 200 microns, between about 1 micron and about 100 microns, between about 5 microns and about 50 microns, between about 5 microns and about 25 microns, or between about 10 microns and about 25 microns). Other ranges are also possible. The choice of the thickness may depend on cell design parameters such as the excess amount of lithium desired, cycle life, and the thickness of the second electrode.

In some embodiments, the electroactive material within a second electrode (e.g., a cathode active electrode species in a cathode of an electrochemical cell described herein) can comprise metal oxides. In some embodiments, an intercalation electrode (e.g., a lithium-intercalation cathode, also referred to herein as a lithium ion intercalation cathode) may be used (e.g., as a second electrode). Non-limiting examples of suitable materials that may intercalate ions of an electroactive material (e.g., alkaline metal ions) include oxides, titanium sulfide, and iron sulfide. In some embodiments, the second electrode (e.g., a cathode) may comprise an intercalation electrode that comprises a lithium transition metal oxide or a lithium transition metal phosphate. Additional examples include $Li_xCoO_2$ (also referred to herein as lithium cobalt oxide; e.g., $Li_{1.1}CoO_2$), $Li_xNiO_2$, $Li_xMnO_2$, $Li_xMn_2O_4$ (e.g., $Li_{1.05}Mn_2O_4$), $Li_xCoPO_4$, $Li_xMnPO_4$, $LiCo_xNi_{(1-x)}O_2$, and $LiCo_xNi_yMn_{(1-x-y)}O_2$ (also referred to herein as lithium nickel manganese cobalt oxide; e.g., $LiNi_{1/3}Mn_{1/3}Co_{1/3}O_2$, $LiNi_{3/5}Mn_{1/5}Co_{1/5}O_2$, $LiNi_{4/5}Mn_{1/10}Co_{1/10}O_2$, $LiNi_{1/2}Mn_{3/10}Co_{1/5}O_2$). X (e.g., for intercalation cathodes with a chemical composition $Li_xM_yO_z$ as described elsewhere herein, where M is a metal or combination of metals) may be greater than or equal to 0 and less than or equal to 2. X is typically greater than or equal to 1 and less than or equal to 2 when the electrochemical cell is fully discharged, and less than 1 when the electrochemical cell is fully charged. In some embodiments, a fully charged electrochemical cell may have a value of x that is greater than or equal to 1 and less than or equal to 1.05, greater than or equal to 1 and less than or equal to 1.1, or greater than or equal to 1 and less than or equal to 1.2. Further examples include $Li_xNiPO_4$, where $0<x\leq1$, $LiMn_xNi_yO_4$ where x+y=2 (e.g., $LiMn_{1.5}Ni_{0.5}O_4$), $LiNi_xCo_yAl_zO_2$ where x+y+z=1 (also referred to herein as lithium nickel cobalt aluminum oxide), $LiFePO_4$ (also referred to herein as lithium iron phosphate), and combinations thereof. In some embodiments, the electroactive material within the second electrode (e.g., a cathode) can comprise lithium transition metal phosphates (e.g., $LiFePO_4$), which can, in some embodiments, be substituted with borates and/or silicates.

In some embodiments, the electroactive material within a second electrode (e.g., a cathode active electrode species in a cathode of an electrochemical cell described herein) can comprise electroactive transition metal chalcogenides, electroactive conductive polymers, and/or electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, a second electrode (e.g., as a cathode active electrode species in the cathode of the electrochemical cells described herein) can comprise an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. In some embodiments, it may be desirable to use polypyrroles, polyanilines, and/or polyacetylenes as conductive polymers.

In some embodiments, an electrochemical cell described herein comprises at least one current collector. Materials for the current collector may be selected, in some cases, from metals (e.g., copper, nickel, aluminum, passivated metals, and other appropriate metals), metallized polymers, electrically conductive polymers, polymers comprising conductive particles dispersed therein, and other appropriate materials. In some embodiments, the current collector is deposited onto the electrode layer using physical vapor deposition, chemical vapor deposition, electrochemical deposition, sputtering, doctor blading, flash evaporation, or any other appropriate deposition technique for the selected material. In some cases, the current collector may be formed separately and bonded to the electrode structure. It should be appreciated, however, that in some embodiments a current collector separate from the electroactive layer is not needed or present.

As described herein, in some embodiments, an electrochemical cell includes a separator. The separator generally comprises a polymeric material (e.g., polymeric material that does or does not swell upon exposure to electrolyte). In some embodiments, the separator is located between the electrolyte and an electrode (e.g., between the electrolyte and a first electrode, between the electrolyte and a second electrode, between the electrolyte and an anode, or between the electrolyte and a cathode).

A separator can be made of a variety of materials. The separator may be polymeric in some instances, or formed of an inorganic material (e.g., glass fiber filter papers) in other instances. Examples of suitable separator materials include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK), and combinations thereof.

In some embodiments, an electrochemical cell described herein is designed to include a second electrode with an electroactive material (e.g., a cathode active electrode species in a cathode of an electrochemical cell described herein) having a moderate voltage with respect to lithium metal. The voltage of an electroactive material with respect to lithium metal may be measured by first cycling an electrochemical cell comprising the electroactive material and lithium metal at least four times (e.g., 5 times, 6 times, 8 times, 10 times) at a rate of C/5, then discharging the electrochemical cell at a rate of C/5 and measuring the voltage as the cell discharges. The average voltage measured over the discharge process is then determined, and this value is considered to be the voltage with respect to lithium metal. In some embodiments, the electroactive material within the second electrode has a voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In some embodiments, the electroactive material within the second electrode has a voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

In some embodiments, an electrochemical cell described herein is designed to include a second electrode with an electroactive material (e.g., a cathode active electrode species in a cathode of an electrochemical cell described herein) having a moderate open circuit voltage with respect to lithium metal. The open circuit voltage of an electroactive material with respect to lithium metal may be measured by determining the open circuit voltage of a battery comprising the electroactive material and lithium metal when the battery is charged to half its capacity. This may be accomplished by first determining the capacity of the battery by cycling the battery. The battery can then be charged to half of its measured capacity and allowed to rest for two minutes. After these steps, the open circuit voltage may be measured. In some embodiments, the electroactive material within the second electrode has an open circuit voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In some embodiments, the electroactive material within the second electrode has an open circuit voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

Characteristics of electroactive materials (e.g., for a second electrode) other than their voltages and open circuit voltages with respect to lithium may also be relevant in some embodiments. For example, in some embodiments, an electrochemical cell may include a second electrode comprising an electroactive material (e.g., a cathode active electrode species in a cathode of an electrochemical cell described herein) that exhibits one or more plateaus in the value of voltage with respect to lithium as a function of cycle life during charging and/or discharging, and the value of the plateau(s) may be one or more of the values described above in relation to the voltage of the material with respect to lithium metal. As used herein, an electroactive material exhibits a plateau (i.e., a plateau voltage) when it shows a constant or substantially constant voltage (e.g., varying by less than or equal to 10%, or less than or equal to 5%) with respect to lithium during at least some portion of a charging and/or discharging procedure. The voltage at which a plateau occurs for an electroactive material (i.e., a plateau voltage) may be determined by employing the same procedure used to determine the voltage of an electroactive material with respect to lithium metal, evaluating whether any regions consistent with plateaus are observed, and determining the average voltage in those region(s) if present. In some embodiments, the electroactive material within the second electrode has a plateau voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In some embodiments, the electroactive material within the second electrode has a plateau voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

As another example, the electrochemical cell may include a second electrode comprising an electroactive material that would be suitable for charging to less than 5 V, less than 4.5 V, less than 4 V, or less than 3.5 V under normal operating conditions (e.g., if one were to charge the second electrode to, e.g., 5 V, 4.5 V, 4 V, or 3.5 V or higher, respectively, it would typically be considered an abuse test, would not be recommended by the manufacturer, and/or would present safety concerns).

In some embodiments, one or more of the voltages measured during the charge and/or discharge process in a cell comprising a lithium metal electrode (e.g., maximum voltage, minimum voltage, median voltage, modal voltage) may have one or more of the values described above in relation to the average voltage. In some embodiments, the electroactive material within the second electrode has a maximum voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In some embodiments, the electroactive material within the second electrode has a maximum voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

In some embodiments, the electroactive material within the second electrode has a minimum voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In some embodiments, the electroactive material within the second electrode has a minimum voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

In some embodiments, the electroactive material within the second electrode has a median voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In some embodiments, the electroactive material within the second electrode has a median voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

In some embodiments, the electroactive material within the second electrode has a modal voltage with respect to lithium metal of greater than or equal to 2.8 V, greater than or equal to 3 V, greater than or equal to 3.2 V, greater than or equal to 3.4 V, greater than or equal to 3.6 V, greater than or equal to 3.8 V, greater than or equal to 4.0 V, greater than or equal to 4.2 V, or greater than or equal to 4.4 V. In some embodiments, the electroactive material within the second electrode has a modal voltage with respect to lithium metal of less than or equal to 4.5 V, less than or equal to 4.2 V, less than or equal to 4.0 V, less than or equal to 3.8 V, less than or equal to 3.6 V, less than or equal to 3.4 V, less than or equal to 3.2 V, or less than or equal to 3 V. Combinations of the above-referenced ranges are also possible (e.g., greater than or equal to 2.8 V and less than or equal to 4.5 V). Other ranges are also possible.

It can be advantageous, according to some embodiments, to apply an anisotropic force to the electrochemical cells described herein during charge and/or discharge. In some embodiments, the electrochemical cells and/or the electrodes described herein can be configured to withstand an applied anisotropic force (e.g., a force applied to enhance the morphology of an electrode within the cell) while maintaining their structural integrity.

In some embodiments, any of the electrodes described herein can be part of an electrochemical cell that is constructed and arranged such that, during at least one period of time during charge and/or discharge of the cell, an anisotropic force with a component normal to the active surface of an electrode within the electrochemical cell (e.g., an anode comprising lithium metal and/or a lithium alloy) is applied to the cell. In one set of embodiments, the applied anisotropic force can be selected to enhance the morphology of an electrode (e.g., an anode such as a lithium metal and/or a lithium alloy anode).

An "anisotropic force" is given its ordinary meaning in the art and means a force that is not equal in all directions. A force equal in all directions is, for example, internal pressure of a fluid or material within the fluid or material, such as internal gas pressure of an object. Examples of forces not equal in all directions include forces directed in a particular direction, such as the force on a table applied by an object on the table via gravity. Another example of an anisotropic force includes a force applied by a band arranged around a perimeter of an object. For example, a rubber band or turnbuckle can apply forces around a perimeter of an object around which it is wrapped. However, the band may not apply any direct force on any part of the exterior surface of the object not in contact with the band. In addition, when the band is expanded along a first axis to a greater extent than a second axis, the band can apply a larger force in the direction parallel to the first axis than the force applied parallel to the second axis. In some such cases, the anisotropic force comprises a component normal to an active surface of an electrode within an electrochemical cell. As used herein, the term "active surface" is used to describe a surface of an electrode at which electrochemical reactions may take place. A force with a "component normal" to a surface is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill can understand other examples of these terms, especially as applied within the description of this document. In the case of a curved surface (for example, a concave surface or a convex surface), the component of the anisotropic force that is normal to an active surface of an electrode may correspond to the component normal to a plane that is tangent to the curved surface at the point at which the anisotropic force is applied. The anisotropic force may be applied, in some cases, at one or more pre-determined locations, optionally distributed over the active surface of the anode. In some embodiments, the anisotropic force is applied uniformly over the active surface of the first electrode (e.g., of the anode).

Any of the electrochemical cell properties and/or performance metrics described herein may be achieved, alone or in combination with each other, while an anisotropic force is applied to the electrochemical cell (e.g., during charge and/or discharge of the cell) during charge and/or discharge. In certain embodiments, the anisotropic force applied to the electrode, to the electrochemical cell (e.g., during at least one period of time during charge and/or discharge of the cell) can include a component normal to an active surface of an electrode (e.g., an anode such as a lithium metal and/or lithium alloy anode within the electrochemical cell). In some embodiments, the component of the anisotropic force that is normal to the active surface of the electrode defines a pressure of at least about 1 kg/cm$^2$, at least about 2 kg/cm$^2$, at least about 4 kg/cm$^2$, at least about 6 kg/cm$^2$, at least about 8 kg/cm$^2$, at least about 10 kg/cm$^2$, at least about 12 kg/cm$^2$, at least about 14 kg/cm$^2$, at least about 16 kg/cm$^2$, at least about 18 kg/cm$^2$, at least about 20 kg/cm$^2$, at least about 22 kg/cm$^2$, at least about 24 kg/cm$^2$, at least about 26 kg/cm$^2$, at least about 28 kg/cm$^2$, at least about 30 kg/cm$^2$, at least about 32 kg/cm$^2$, at least about 34 kg/cm$^2$, at least about 36 kg/cm$^2$, at least about 38 kg/cm$^2$, at least about 40 kg/cm$^2$, at least about 42 kg/cm$^2$, at least about 44 kg/cm$^2$, at least about 46 kg/cm$^2$, or at least about 48 kg/cm$^2$. In some embodiments, the component of the anisotropic force normal to the active surface may, for example, define a pressure of less than about 50 kg/cm$^2$, less than about 48 kg/cm$^2$, less than about 46 kg/cm$^2$, less than about 44 kg/cm$^2$, less than about 42 kg/cm$^2$, less than about 40 kg/cm$^2$, less than about 38 kg/cm$^2$, less than about 36 kg/cm$^2$, less than about 34 kg/cm$^2$, less than about 32 kg/cm$^2$, less than about 30 kg/cm$^2$, less than about 28 kg/cm$^2$, less than about 26 kg/cm$^2$, less than about 24 kg/cm$^2$, less than about 22 kg/cm$^2$, less than about 20 kg/cm$^2$, less than about 18 kg/cm$^2$, less about 16 kg/cm$^2$, less than about 14 kg/cm$^2$, less than about 12 kg/cm$^2$, less than about 10 kg/cm$^2$, less than about 8 kg/cm$^2$, less than about 6 kg/cm$^2$, less than about 4 kg/cm$^2$, or less than about 2 kg/cm$^2$. Combinations of the above-referenced ranges are also possible (e.g., at least about 1 kg/cm$^2$ and less than about 50 kg/cm$^2$, at least about 1 kg/cm$^2$ and less than about 40 kg/cm$^2$, at least about 1 kg/cm$^2$ and less than about 30 kg/cm$^2$, at least about 1 kg/cm$^2$ and less than about 20 kg/cm$^2$, or at least about 10 kg/cm$^2$ and less than about 20 kg/cm$^2$). Other ranges are also possible.

The anisotropic forces applied during charge and/or discharge as described herein may be applied using any method known in the art. In some embodiments, the force may be applied using compression springs. Forces may be applied using other elements (either inside or outside a containment structure) including, but not limited to Belleville washers, machine screws, pneumatic devices, and/or weights, among others. In some cases, cells may be pre-compressed before they are inserted into containment structures, and, upon being inserted to the containment structure, they may expand to produce a net force on the cell. Suitable methods for applying such forces are described in detail, for example, in U.S. Pat. No. 9,105,938, which is incorporated herein by reference in its entirety.

In some embodiments, the electrolytes and/or other components described herein may be part of an electrochemical cell (e.g., a rechargeable electrochemical cell). In some embodiments, the electrolytes and/or other components described herein may be part of an electrochemical cell that is integrated into a battery (e.g., a rechargeable battery). In some embodiments, an electrochemical cell disclosed herein is integrated into a battery (e.g., a rechargeable battery). In some embodiments, the electrochemical cells and/or rechargeable batteries described herein can be used to provide power to an electric vehicle or otherwise be incorporated into an electric vehicle. As a non-limiting example, electrochemical cells and/or rechargeable batteries described herein can, in some embodiments, be used to provide power to a drive train of an electric vehicle. The vehicle may be any suitable vehicle, adapted for travel on land, sea, and/or air. For example, the vehicle may be an automobile, truck, motorcycle, boat, helicopter, airplane, and/or any other suitable type of vehicle.

For convenience, certain terms employed in the specification, examples, and appended claims are listed here. Definitions of specific functional groups and chemical terms are described in more detail below. For purposes of this invention, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito: 1999.

The term "aliphatic," as used herein, includes both saturated and unsaturated, nonaromatic, straight chain (i.e., unbranched), branched, acyclic, and cyclic (i.e., carbocyclic) hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Likewise, the term "heteroaliphatic" refers to heteroalkyl, heteroalkenyl, heteroalkynyl, and heterocyclic groups. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In some embodiments, as used herein, "aliphatic" is used to indicate those aliphatic groups (cyclic, acyclic, substituted, unsubstituted, branched or unbranched) having 1-20 carbon atoms. Aliphatic group substituents include, but are not limited to, any of the substituents described herein, that result in the formation of a stable moiety (e.g., aliphatic, alkyl, alkenyl, alkynyl, heteroaliphatic, heterocyclic, aryl, heteroaryl, acyl, oxo, imino, thiooxo, cyano, isocyano, amino, azido, nitro, hydroxyl, thiol, halo, aliphaticamino, heteroaliphaticamino, alkylamino, heteroalkylamino, arylamino, heteroarylamino, alkylaryl, arylalkyl, aliphaticoxy, heteroaliphaticoxy, alkyloxy, heteroalkyloxy, aryloxy, heteroaryloxy, aliphaticthioxy, heteroaliphaticthioxy, alkylthioxy, heteroalkylthioxy, arylthioxy, heteroarylthioxy, acyloxy, and the like, each of which may or may not be further substituted).

The term "alkyl" refers to the radical of saturated aliphatic groups, including straight-chain alkyl groups, branched-chain alkyl groups, cycloalkyl (alicyclic) groups, alkyl substituted cycloalkyl groups, and cycloalkyl substituted alkyl groups. The alkyl groups may be optionally substituted, as described more fully below. Examples of alkyl groups include, but are not limited to, methyl, ethyl, propyl, isopropyl, butyl, isobutyl, tert-butyl, 2-ethylhexyl, cyclopropyl, cyclobutyl, cyclopentyl, cyclohexyl, and the like. "Heteroalkyl" groups are alkyl groups wherein at least one atom is a heteroatom (e.g., oxygen, sulfur, nitrogen, phosphorus, etc.), with the remainder of the atoms being carbon atoms. Examples of heteroalkyl groups include, but are not limited to, alkoxy, poly(ethylene glycol)-, alkyl-substituted amino, tetrahydrofuranyl, piperidinyl, morpholinyl, etc.

The terms "alkenyl" and "alkynyl" refer to unsaturated aliphatic groups analogous to the alkyl groups described above, but containing at least one double or triple bond respectively. The "heteroalkenyl" and "heteroalkynyl" refer to alkenyl and alkynyl groups as described herein in which one or more atoms is a heteroatom (e.g., oxygen, nitrogen, sulfur, and the like).

The term "haloaliphatic" refers to an aliphatic group, wherein one or more hydrogen atoms, such as one to 10 hydrogen atoms, are independently replaced with a halogen atom, such as fluoro, bromo, chloro, or iodo.

The term "haloheteroaliphatic" refers to a heteroaliphatic group, wherein one or more hydrogen atoms, such as one to 10 hydrogen atoms, are independently replaced with a halogen atom, such as fluoro, bromo, chloro, or iodo.

The term "haloalkyl" is a substituted alkyl group, wherein one or more of the hydrogen atoms are independently replaced by a halogen, e.g., fluoro, bromo, chloro, or iodo. In some embodiments, the haloalkyl moiety has 1 to 8 carbon atoms ("$C_{1-8}$ haloalkyl"). In some embodiments, the haloalkyl moiety has 1 to 6 carbon atoms ("$C_{1-6}$ haloalkyl"). In some embodiments, the haloalkyl moiety has 1 to 4 carbon atoms ("$C_{1-4}$ haloalkyl"). In some embodiments, the haloalkyl moiety has 1 to 3 carbon atoms ("$C_{1-3}$ haloalkyl"). In some embodiments, the haloalkyl moiety has 1 to 2 carbon atoms ("$C_{1-2}$ haloalkyl"). Examples of haloalkyl groups include —$CHF_2$, —$CH_2F$, —$CF_3$, —$CH_2CF_3$, —$CF_2CF_3$, —$CF_2CF_2CF_3$, —$CCl_3$, $CFCl_2$, —$CF_2Cl$, and the like.

The term "aryl" refers to an aromatic carbocyclic group having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl), all optionally substituted. "Heteroaryl" groups are aryl groups wherein at least one ring atom in the aromatic ring is a heteroatom, with the remainder of the ring atoms being carbon atoms. Examples of heteroaryl groups include furanyl, thienyl, pyridyl, pyrrolyl, N lower alkyl pyrrolyl, pyridyl N oxide, pyrimidyl, pyrazinyl, imidazolyl, indolyl and the like, all optionally substituted.

The terms "amine" and "amino" refer to both unsubstituted and substituted amines, e.g., a moiety that can be represented by the general formula: N(R')(R'')(R''') wherein R', R'', and R''' each independently represent a group permitted by the rules of valence.

The terms "acyl," "carboxyl group," or "carbonyl group" are recognized in the art and can include such moieties as can be represented by the general formula:

wherein W is H, OH, O-alkyl, O-alkenyl, or a salt thereof. Where W is O-alkyl, the formula represents an "ester." Where W is OH, the formula represents a "carboxylic acid." In general, where the oxygen atom of the above formula is replaced by sulfur, the formula represents a "thiolcarbonyl" group. Where W is a S-alkyl, the formula represents a "thiolester." Where W is SH, the formula represents a "thiolcarboxylic acid." On the other hand, where W is alkyl, the above formula represents a "ketone" group. Where W is hydrogen, the above formula represents an "aldehyde" group.

As used herein, the term "heteroaromatic" or "heteroaryl" means a monocyclic or polycyclic heteroaromatic ring (or radical thereof) comprising carbon atom ring members and one or more heteroatom ring members (such as, for example, oxygen, sulfur or nitrogen). Typically, the heteroaromatic ring has from 5 to about 14 ring members in which at least 1 ring member is a heteroatom selected from oxygen, sulfur, and nitrogen. In another embodiment, the heteroaromatic ring is a 5 or 6 membered ring and may contain from 1 to about 4 heteroatoms. In another embodiment, the heteroaromatic ring system has a 7 to 14 ring members and may contain from 1 to about 7 heteroatoms. Representative heteroaryls include pyridyl, furyl, thienyl, pyrrolyl, oxazolyl, imidazolyl, indolizinyl, thiazolyl, isoxazolyl, pyrazolyl, isothiazolyl, pyridazinyl, pyrimidinyl, pyrazinyl, triazinyl, triazolyl, pyridinyl, thiadiazolyl, pyrazinyl, quinolyl, isoquinolyl, indazolyl, benzoxazolyl, benzofuryl, benzothiazolyl, indolizinyl, imidazopyridinyl, isothiazolyl, tetrazolyl, benzimidazolyl, benzoxazolyl, benzothiazolyl, benzothiadiazolyl, benzoxadiazolyl, carbazolyl, indolyl, tetrahydroindolyl, azaindolyl, imidazopyridyl, qunizaolinyl, purinyl, pyrrolo[2,3]pyrimidyl, pyrazolo[3,4]pyrimidyl, benzo(b)thienyl, and the like. These heteroaryl groups may be optionally substituted with one or more substituents.

The term "haloaryl" refers to an aryl group, wherein one or more hydrogen atoms are independently replaced with a halogen atom, such as fluoro, bromo, chloro, or iodo.

The term "haloheteroaryl" refers to a heteroaryl group, wherein one or more hydrogen atoms are independently replaced with a halogen atom, such as fluoro, bromo, chloro, or iodo.

The term "substituted" is contemplated to include all permissible substituents of organic compounds, "permissible" being in the context of the chemical rules of valence known to those of ordinary skill in the art. In some cases, "substituted" may generally refer to replacement of a hydrogen with a substituent as described herein. However, "substituted," as used herein, does not encompass replacement and/or alteration of a key functional group by which a molecule is identified, e.g., such that the "substituted" functional group becomes, through substitution, a different functional group. For example, a "substituted phenyl" must still comprise the phenyl moiety and cannot be modified by substitution, in this definition, to become, e.g., a heteroaryl group such as pyridine. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this invention, the heteroatoms such as nitrogen may have hydrogen substituents and/or any permissible substituents of organic compounds described herein which satisfy the valencies of the heteroatoms. This invention is not intended to be limited in any manner by the permissible substituents of organic compounds.

Examples of substituents include, but are not limited to, alkyl, aryl, aralkyl, cyclic alkyl, heterocycloalkyl, hydroxy, alkoxy, aryloxy, perhaloalkoxy, aralkoxy, heteroaryl, heteroaryloxy, heteroarylalkyl, heteroaralkoxy, azido, amino, halogen, alkylthio, oxo, acyl, acylalkyl, carboxy esters, carboxyl, carboxamido, nitro, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, alkoxyalkyl, perhaloalkyl, arylalkyloxyalkyl, and the like.

The following applications are incorporated herein by reference, in their entirety, for all purposes: U.S. Publication No. US-2007-0221265-A1 published on Sep. 27, 2007, filed as U.S. application Ser. No. 11/400,781 on Apr. 6, 2006, and entitled "RECHARGEABLE LITHIUM/WATER, LITHIUM/AIR BATTERIES"; U.S. Publication No. US-2009-0035646-A1, published on Feb. 5, 2009, filed as U.S. application Ser. No. 11/888,339 on Jul. 31, 2007, and entitled "SWELLING INHIBITION IN BATTERIES"; U.S. Publication No. US-2010-0129699-A1 published on May 17, 2010, filed as U.S. application Ser. No. 12/312,764 on Feb. 2, 2010; patented as U.S. Pat. No. 8,617,748 on Dec. 31, 2013, and entitled "SEPARATION OF ELECTROLYTES"; U.S. Publication No. US-2010-0291442-A1 published on Nov. 18, 2010, filed as U.S. application Ser. No. 12/682,011 on Jul. 30, 2010, patented as U.S. Pat. No. 8,871,387 on Oct. 28, 2014, and entitled "PRIMER FOR BATTERY ELECTRODE"; U.S. Publication No. US-2009-0200986-A1 published on Aug. 13, 2009, filed as U.S. application Ser. No. 12/069,335 on Feb. 8, 2008, patented as U.S. Pat. No. 8,264,205 on Sep. 11, 2012, and entitled "CIRCUIT FOR CHARGE AND/OR DISCHARGE PROTECTION IN AN ENERGY-STORAGE DEVICE"; U.S. Publication No. US-2007-0224502-A1 published on Sep. 27, 2007, filed as U.S. application Ser. No. 11/400,025 on Apr. 6, 2006, patented as U.S. Pat. No. 7,771,870 on Aug. 10, 2010, and entitled "ELECTRODE PROTECTION IN BOTH AQUEOUS AND NON-AQUEOUS ELECTROCHEMICAL CELLS, INCLUDING RECHARGEABLE LITHIUM BATTERIES"; U.S. Publication No. US-2008-0318128-A1 published on Dec. 25, 2008, filed as U.S. application Ser. No. 11/821,576 on Jun. 22, 2007, and entitled "LITHIUM ALLOY/SULFUR BATTERIES"; U.S. Publication No. US-2002-0055040-A1 published on May 9, 2002, filed as U.S. application Ser. No. 09/795,915 on Feb. 27, 2001, patented as U.S. Pat. No. 7,939,198 on May 10, 2011, and entitled "NOVEL COMPOSITE CATHODES, ELECTROCHEMICAL CELLS COMPRISING NOVEL COMPOSITE CATHODES, AND PROCESSES FOR FABRICATING SAME"; U.S. Publication No. US-2006-0238203-A1 published on Oct. 26, 2006, filed as U.S. application Ser. No. 11/111,262 on Apr. 20, 2005, patented as U.S. Pat. No. 7,688,075 on Mar. 30, 2010, and entitled "LITHIUM SULFUR RECHARGEABLE BATTERY FUEL GAUGE SYSTEMS AND METHODS"; U.S. Publication No. US-2008-0187663-A1 published on Aug. 7, 2008, filed as U.S. application Ser. No. 11/728,197 on Mar. 23, 2007, patented as U.S. Pat. No. 8,084,102 on Dec. 27, 2011, and entitled "METHODS FOR CO-FLASH EVAPORATION OF POLYMERIZABLE MONOMERS AND NON-POLYMERIZABLE CARRIER SOLVENT/SALT MIXTURES/SOLUTIONS"; U.S. Publication No. US-2011-0006738-A1 published on Jan. 13, 2011, filed as U.S. application Ser. No. 12/679,371 on Sep. 23, 2010, and entitled "ELECTROLYTE ADDITIVES FOR LITHIUM BATTERIES AND RELATED METHODS"; U.S. Publication No. US-2011-0008531-A1 published on Jan. 13, 2011, filed as U.S. application Ser. No. 12/811,576 on Sep. 23, 2010, patented as U.S. Pat. No. 9,034,421 on May 19, 2015, and entitled "METHODS OF FORMING ELECTRODES COMPRISING SULFUR AND POROUS MATERIAL COMPRISING CARBON"; U.S. Publication No. US-2010-0035128-A1 published on Feb. 11, 2010, filed as U.S. application Ser. No. 12/535,328 on Aug. 4, 2009, patented as U.S. Pat. No. 9,105,938 on Aug. 11, 2015, and entitled "APPLICATION OF FORCE IN ELECTROCHEMICAL CELLS"; U.S. Publication No. US-2011-0165471-A9 published on Jul. 15, 2011, filed as U.S. application Ser. No. 12/180,379 on Jul. 25, 2008, and entitled "PROTECTION OF ANODES FOR ELECTROCHEMICAL CELLS"; U.S. Publication No. US-2006-0222954-A1 published on Oct. 5, 2006, filed as U.S. application Ser. No. 11/452,445 on Jun. 13, 2006, patented as U.S. Pat. No. 8,415,054 on Apr. 9, 2013, and entitled "LITHIUM ANODES FOR ELECTROCHEMICAL CELLS"; U.S. Publication No. US-2010-0239914-A1 published on Sep. 23, 2010, filed as U.S. application Ser. No. 12/727,862 on Mar. 19, 2010, and entitled "CATHODE FOR LITHIUM BATTERY"; U.S.

Publication No. US-2010-0294049-A1 published on Nov. 25, 2010, filed as U.S. application Ser. No. 12/471,095 on May 22, 2009, patented as U.S. Pat. No. 8,087,309 on Jan. 3, 2012, and entitled "HERMETIC SAMPLE HOLDER AND METHOD FOR PERFORMING MICROANALYSIS UNDER CONTROLLED ATMOSPHERE ENVIRONMENT"; U.S. Publication No. US-2011-0076560-A1 published on Mar. 31, 2011, filed as U.S. application Ser. No. 12/862,581 on Aug. 24, 2010, and entitled "ELECTROCHEMICAL CELLS COMPRISING POROUS STRUCTURES COMPRISING SULFUR"; U.S. Publication No. US-2011-0068001-A1 published on Mar. 24, 2011, filed as U.S. application Ser. No. 12/862,513 on Aug. 24, 2010, and entitled "RELEASE SYSTEM FOR ELECTROCHEMICAL CELLS"; U.S. Publication No. US-2012-0048729-A1 published on Mar. 1, 2012, filed as U.S. application Ser. No. 13/216,559 on Aug. 24, 2011, and entitled "ELECTRICALLY NON-CONDUCTIVE MATERIALS FOR ELECTROCHEMICAL CELLS"; U.S. Publication No. US-2011-0177398-A1 published on Jul. 21, 2011, filed as U.S. application Ser. No. 12/862,528 on Aug. 24, 2010, patented as U.S. Pat. No. 10,629,947 on Apr. 21, 2020, and entitled "ELECTROCHEMICAL CELL"; U.S. Publication No. US-2011-0070494-A1 published on Mar. 24, 2011, filed as U.S. application Ser. No. 12/862,563 on Aug. 24, 2010, and entitled "ELECTROCHEMICAL CELLS COMPRISING POROUS STRUCTURES COMPRISING SULFUR"; U.S. Publication No. US-2011-0070491-A1 published on Mar. 24, 2011, filed as U.S. application Ser. No. 12/862,551 on Aug. 24, 2010, and entitled "ELECTROCHEMICAL CELLS COMPRISING POROUS STRUCTURES COMPRISING SULFUR"; U.S. Publication No. US-2011-0059361-A1 published on Mar. 10, 2011, filed as U.S. application Ser. No. 12/862,576 on Aug. 24, 2010, patented as U.S. Pat. No. 9,005,809 on Apr. 14, 2015, and entitled "ELECTROCHEMICAL CELLS COMPRISING POROUS STRUCTURES COMPRISING SULFUR"; U.S. Publication No. US-2012-0052339-A1 published on Mar. 1, 2012, filed as U.S. application Ser. No. 13/216,579 on Aug. 24, 2011, and entitled "ELECTROLYTE MATERIALS FOR USE IN ELECTROCHEMICAL CELLS"; U.S. Publication No. US-2012-0070746-A1 published on Mar. 22, 2012, filed as U.S. application Ser. No. 13/240,113 on Sep. 22, 2011, and entitled "LOW ELECTROLYTE ELECTROCHEMICAL CELLS"; U.S. Publication No. US-2011-0206992-A1 published on Aug. 25, 2011, filed as U.S. application Ser. No. 13/033,419 on Feb. 23, 2011, and entitled "POROUS STRUCTURES FOR ENERGY STORAGE DEVICES"; U.S. Publication No. US-2012-0082872-A1 published on Apr. 5, 2012, filed as U.S. application Ser. No. 13/249,605 on Sep. 30, 2011, and entitled "ADDITIVE FOR ELECTROLYTES"; U.S. Publication No. US-2012-0082901-A1 published on Apr. 5, 2012, filed as U.S. application Ser. No. 13/249,632 on Sep. 30, 2011, and entitled "LITHIUM-BASED ANODE WITH IONIC LIQUID POLYMER GEL"; U.S. Publication No. US-2013-0164635-A1 published on Jun. 27, 2013, filed as U.S. application Ser. No. 13/700,696 on Mar. 6, 2013, patented as U.S. Pat. No. 9,577,243 on Feb. 21, 2017, and entitled "USE OF EXPANDED GRAPHITE IN LITHIUM/SULPHUR BATTERIES"; U.S. Publication No. US-2013-0017441-A1 published on Jan. 17, 2013, filed as U.S. application Ser. No. 13/524,662 on Jun. 15, 2012, patented as U.S. Pat. No. 9,548,492 on Jan. 17, 2017, and entitled "PLATING TECHNIQUE FOR ELECTRODE"; U.S. Publication No. US-2013-0224601-A1 published on Aug. 29, 2013, filed as U.S. application Ser. No. 13/766,862 on Feb. 14, 2013, patented as U.S. Pat. No. 9,077,041 on Jul. 7, 2015, and entitled "ELECTRODE STRUCTURE FOR ELECTROCHEMICAL CELL"; U.S. Publication No. US-2013-0252103-A1 published on Sep. 26, 2013, filed as U.S. application Ser. No. 13/789,783 on Mar. 8, 2013, patented as U.S. Pat. No. 9,214,678 on Dec. 15, 2015, and entitled "POROUS SUPPORT STRUCTURES, ELECTRODES CONTAINING SAME, AND ASSOCIATED METHODS"; U.S. Publication No. US-2015-0287998-A1 published on Oct. 8, 2015, filed as U.S. application Ser. No. 14/743,304 on Jun. 18, 2015, patented as U.S. Pat. No. 9,577,267 on Feb. 21, 2017, and entitled "ELECTRODE STRUCTURE AND METHOD FOR MAKING SAME"; U.S. Publication No. US-2013-0095380-A1 published on Apr. 18, 2013, filed as U.S. application Ser. No. 13/644,933 on Oct. 4, 2012, patented as U.S. Pat. No. 8,936,870 on Jan. 20, 2015, and entitled "ELECTRODE STRUCTURE AND METHOD FOR MAKING THE SAME"; U.S. Publication No. US-2012-0052397-A1 published on Mar. 1, 2012, filed as U.S. application Ser. No. 13/216,538 on Aug. 24, 2011, patented as U.S. Pat. No. 9,853,287 on Dec. 26, 2017, and entitled "ELECTROLYTE MATERIALS FOR USE IN ELECTROCHEMICAL CELLS"; U.S. Publication No. US-2014-0123477-A1 published on May 8, 2014, filed as U.S. application Ser. No. 14/069,698 on Nov. 1, 2013, patented as U.S. Pat. No. 9,005,311 on Apr. 14, 2015, and entitled "ELECTRODE ACTIVE SURFACE PRETREATMENT"; U.S. Publication No. US-2014-0193723-A1 published on Jul. 10, 2014, filed as U.S. application Ser. No. 14/150,156 on Jan. 8, 2014, patented as U.S. Pat. No. 9,559,348 on Jan. 31, 2017, and entitled "CONDUCTIVITY CONTROL IN ELECTROCHEMICAL CELLS"; U.S. Publication No. US-2014-0255780-A1 published on Sep. 11, 2014, filed as U.S. application Ser. No. 14/197,782 on Mar. 5, 2014, patented as U.S. Pat. No. 9,490,478 on Nov. 8, 2016, and entitled "ELECTROCHEMICAL CELLS COMPRISING FIBRIL MATERIALS"; U.S. Publication No. US-2014-0272594-A1 published on Sep. 18, 2014, filed as U.S. application Ser. No. 13/833,377 on Mar. 15, 2013, and entitled "PROTECTIVE STRUCTURES FOR ELECTRODES"; U.S. Publication No. US-2014-0272597-A1 published on Sep. 18, 2014, filed as U.S. application Ser. No. 14/209,274 on Mar. 13, 2014, patented as U.S. Pat. No. 9,728,768 on Aug. 8, 2017, and entitled "PROTECTED ELECTRODE STRUCTURES AND METHODS"; U.S. Publication No. US-2015-0280277-A1 published on Oct. 1, 2015, filed as U.S. application Ser. No. 14/668,102 on Mar. 25, 2015, patented as U.S. Pat. No. 9,755,268 on Sep. 5, 2017, and entitled "GEL ELECTROLYTES AND ELECTRODES"; U.S. Publication No. US-2015-0180037-A1 published on Jun. 25, 2015, filed as U.S. application Ser. No. 14/576,570 on Dec. 19, 2014, patented as U.S. Pat. No. 10,020,512 on Jul. 10, 2018, and entitled "POLYMER FOR USE AS PROTECTIVE LAYERS AND OTHER COMPONENTS IN ELECTROCHEMICAL CELLS"; U.S. Publication No. US-2015-0349310-A1 published on Dec. 3, 2015, filed as U.S. application Ser. No. 14/723,132 on May 27, 2015, patented as U.S. Pat. No. 9,735,411 on Aug. 15, 2017, and entitled "POLYMER FOR USE AS PROTECTIVE LAYERS AND OTHER COMPONENTS IN ELECTROCHEMICAL CELLS"; U.S. Publication No. US-2014-0272595-A1 published on Sep. 18, 2014, filed as U.S. application Ser. No. 14/203,802 on Mar. 11, 2014, and entitled "COMPOSITIONS FOR USE AS PROTECTIVE LAYERS AND OTHER COMPONENTS IN ELECTROCHEMICAL CELLS"; U.S. Publication No. US-2019-0006699-A1 published on Jan. 3, 2019, filed as U.S. application Ser. No. 15/727,438 on Oct. 6, 2017, and entitled "PRESSURE AND/OR TEMPERATURE MANAGEMENT IN ELECTROCHEMICAL SYSTEMS"; U.S. Publication No. US-2014-0193713-A1 published on Jul. 10, 2014, filed as U.S. application Ser. No. 14/150,196 on Jan. 8, 2014, patented as U.S. Pat. No. 9,531,009 on Dec. 27, 2016, and entitled "PASSIVATION OF ELECTRODES IN ELECTROCHEMICAL CELLS"; U.S. Publication No. US-2014-0127577-A1 published on May 8, 2014, filed as U.S. application Ser. No. 14/068,333 on Oct. 31, 2013, patented as U.S. Pat. No. 10,243,202 on Mar. 26, 2019, and entitled "POLYMERS FOR USE AS PROTECTIVE LAYERS AND OTHER COMPONENTS IN ELECTROCHEMICAL CELLS"; U.S. Publication No. US-2015-0318539-A1 published on Nov. 5, 2015, filed as U.S. application Ser. No. 14/700,258 on Apr. 30, 2015, patented as U.S. Pat. No. 9,711,784 on Jul. 18, 2017, and entitled "ELECTRODE FABRICATION METHODS AND ASSOCIATED SYSTEMS AND ARTICLES"; U.S. Publication No. US-2014-0272565-A1 published on Sep. 18, 2014, filed as U.S. application Ser. No. 14/209,396 on Mar. 13, 2014, patented as U.S. Pat. No. 10,862,105 on Dec. 8, 2020 and entitled "PROTECTED ELECTRODE STRUCTURES"; U.S. Publication No. US-2015-0010804-A1 published on Jan. 8, 2015, filed as U.S. application Ser. No. 14/323,269 on Jul. 3, 2014, patented as U.S. Pat. No. 9,994,959 on Jun. 12, 2018, and entitled "CERAMIC/POLYMER MATRIX FOR ELECTRODE PROTECTION IN ELECTROCHEMICAL CELLS, INCLUDING RECHARGEABLE LITHIUM BATTERIES"; U.S. Publication No. US-2015-0162586-A1 published on Jun. 11, 2015, filed as U.S. application Ser. No. 14/561,305 on Dec. 5, 2014, and entitled "NEW SEPARATOR"; U.S. Publication No. US-2015-0044517-A1 published on Feb. 12, 2015, filed as U.S. application Ser. No. 14/455,230 on Aug. 8, 2014, patented as U.S. Pat. No. 10,020,479 on Jul. 10, 2018, and entitled "SELF-HEALING ELECTRODE PROTECTION IN ELECTROCHEMICAL CELLS"; U.S. Publication No. US-2015-0236322-A1 published on Aug. 20, 2015, filed as U.S. application Ser. No. 14/184,037 on Feb. 19, 2014, patented as U.S. Pat. No. 10,490,796 on Nov. 26, 2019, and entitled "ELECTRODE PROTECTION USING ELECTROLYTE-INHIBITING ION CONDUCTOR"; U.S. Publication No. US-2015-0236320-A1 published on Aug. 20, 2015, filed as U.S. application Ser. No. 14/624,641 on Feb. 18, 2015, patented as U.S. Pat. No. 9,653,750 on May 16, 2017, and entitled "ELECTRODE PROTECTION USING A COMPOSITE COMPRISING AN ELECTROLYTE-INHIBITING ION CONDUCTOR"; U.S. Publication No. US-2016-0118638-A1 published on Apr. 28, 2016, filed as U.S. application Ser. No. 14/921,381 on Oct. 23, 2015, and entitled "COMPOSITIONS FOR USE AS PROTECTIVE LAYERS AND OTHER COMPONENTS IN ELECTROCHEMICAL CELLS"; U.S. Publication No. US-2016-0118651-A1 published on Apr. 28, 2016, filed as U.S. application Ser. No. 14/918,672 on Oct. 21, 2015, and entitled "ION-CONDUCTIVE COMPOSITE FOR ELECTROCHEMICAL CELLS"; U.S. Publication No. US-2016-0072132-A1 published on Mar. 10, 2016, filed as U.S. application Ser. No. 14/848,659 on Sep. 9, 2015, patented as U.S. Pat. No. 11,038,178 on Jun. 15, 2021 and entitled "PROTECTIVE LAYERS IN LITHIUM-ION ELECTROCHEMICAL CELLS AND ASSOCIATED ELECTRODES AND METHODS"; U.S. Publication No. US-2018-0138542-A1 published on May 17, 2018, filed as U.S. application Ser. No. 15/567,534 on Oct. 18, 2017, patented as U.S. Pat. No. 10,847,833 on Nov. 24, 2020 and entitled "GLASS-CERAMIC ELECTROLYTES FOR LITHIUM-SULFUR BATTERIES"; U.S. Publication No. US-2016-0344067-A1 published on Nov. 24, 2016, filed as U.S. application Ser. No. 15/160,191 on May 20, 2016, patented as U.S. Pat. No. 10,461,372 on Oct. 29, 2019, and entitled "PROTECTIVE LAYERS FOR ELECTROCHEMICAL CELLS"; U.S. Publication No. US-2020-0099108-A1 published on Mar. 26, 2020, filed as U.S. application Ser. No. 16/587,939 on Sep. 30, 2019, and entitled "PROTECTIVE LAYERS FOR ELECTROCHEMICAL CELLS"; U.S. Publication No. US-2017-0141385-A1 published on May 18, 2017, filed as U.S. application Ser. No. 15/343,890 on Nov. 4, 2016, and entitled "LAYER COMPOSITE AND ELECTRODE HAVING A SMOOTH SURFACE, AND ASSOCIATED METHODS"; U.S. Publication No. US-2017-0141442-A1 published on May 18, 2017, filed as U.S. application Ser. No. 15/349,140 on Nov. 11, 2016, and entitled "ADDITIVES FOR ELECTROCHEMICAL CELLS"; patented as U.S. Pat. No. 10,320,031 on Jun. 11, 2019, and entitled "ADDITIVES FOR ELECTROCHEMICAL CELLS"; U.S. Publication No. US-2017-0149086-A1 published on May 25, 2017, filed as U.S. application Ser. No. 15/343,635 on Nov. 4, 2016, patented as U.S. Pat. No. 9,825,328 on Nov. 21, 2017, and entitled "IONICALLY CONDUCTIVE COMPOUNDS AND RELATED USES"; U.S. Publication No. US-2018-0337406-A1 published on Nov. 22, 2018, filed as U.S. application Ser. No. 15/983,352 on May 18, 2018, patented as U.S. Pat. No. 10,868,306 on Dec. 15, 2020 and entitled "PASSIVATING AGENTS FOR ELECTROCHEMICAL CELLS"; U.S. Publication No. US-2018-0261820-A1 published on Sep. 13, 2018, filed as U.S. application Ser. No. 15/916,588 on Mar. 9, 2018, patented as U.S. Pat. No. 11,024,923 on Jun. 1, 2021 and entitled "ELECTROCHEMICAL CELLS COMPRISING SHORT-CIRCUIT RESISTANT ELECTRONICALLY INSULATING REGIONS"; U.S. Publication No. US-2020-0243824-A1 published on Jul. 30, 2020, filed as U.S. application Ser. No. 16/098,654 on Nov. 2, 2018, patented as U.S. Pat. No. 10,991,925 on Apr. 27, 2021 and entitled "COATINGS FOR COMPONENTS OF ELECTROCHEMICAL CELLS"; U.S. Publication No. US-2018-0351158-A1 published on Dec. 6, 2018, filed as U.S. application Ser. No. 15/983,363 on May 18, 2018, patented as U.S. Pat. No. 10,944,094 on Mar. 9, 2021 and entitled "PASSIVATING AGENTS FOR ELECTROCHEMICAL CELLS"; U.S. Publication No. US-2018-0277850-A1 published on Sep. 27, 2018, filed as U.S. application Ser. No. 15/923,342 on Mar. 16, 2018, and patented as U.S. Pat. No. 10,720,648 on Jul. 21, 2020, and entitled "ELECTRODE EDGE PROTECTION IN ELECTROCHEMICAL CELLS"; U.S. Publication No. US-2018-0358651-A1 published on Dec. 13, 2018, filed as U.S. application Ser. No. 16/002,097 on Jun. 7, 2018, and patented as U.S. Pat. No. 10,608,278 on Mar. 31, 2020, and entitled "IN SITU CURRENT COLLECTOR"; U.S. Publication No. US-2017-0338475-A1 published on Nov. 23, 2017, filed as U.S. application Ser. No. 15/599,595 on May 19, 2017, patented as U.S. Pat. No. 10,879,527 on Dec. 29, 2020, and entitled "PROTECTIVE LAYERS FOR ELECTRODES AND ELECTROCHEMICAL CELLS"; U.S. Publication No. US-2019-0088958-A1 published on Mar. 21, 2019, filed as U.S. application Ser. No. 16/124,384 on Sep. 7, 2018, and entitled "PROTECTIVE MEMBRANE FOR ELECTROCHEMICAL CELLS"; U.S. Publication No. US-2019-0348672-A1 published on Nov. 14, 2019, filed as U.S. application Ser. No. 16/470,708 on Jun. 18, 2019, and entitled "PROTECTIVE LAYERS COMPRISING METALS FOR ELECTROCHEMICAL CELLS"; U.S. Publication No. US-2017-0200975-A1 published Jul. 13, 2017, filed as U.S. application Ser. No. 15/429,439 on Feb. 10, 2017, and patented as U.S. Pat. No. 10,050,308 on Aug. 14, 2018, and entitled "LITHIUM-ION ELECTROCHEMICAL CELL, COMPONENTS THEREOF, AND METHODS OF MAKING AND USING SAME"; U.S. Publication No. US-2018-0351148-A1 published Dec. 6, 2018, filed as U.S. application Ser. No. 15/988,182 on May 24, 2018, and entitled "IONICALLY CONDUCTIVE COMPOUNDS AND RELATED USES"; U.S. Publication No. US-2018-0254516-A1 published Sep. 6, 2018, filed as U.S. application Ser. No. 15/765,362 on Apr. 2, 2018, and entitled "NON-AQUEOUS ELECTROLYTES FOR HIGH ENERGY LITHIUM-ION BATTERIES"; U.S. Publication No. US-2020-0044460-A1 published Feb. 6, 2020, filed as U.S. Application No. 16,527,903 on Jul. 31, 2019, and entitled "MULTIPLEXED CHARGE DISCHARGE BATTERY MANAGEMENT SYSTEM"; U.S. Publication No. US-2020-0220146-A1 published Jul. 9, 2020, filed as U.S. application Ser. No. 16/724,586 on Dec. 23, 2019, and entitled "ISOLATABLE ELECTRODES AND ASSOCIATED ARTICLES AND METHODS"; U.S. Publication No. US-2020-0220149-A1 published Jul. 9, 2020, filed as U.S. application Ser. No. 16/724,596 on Dec. 23, 2019, and entitled "ELECTRODES, HEATERS, SENSORS, AND ASSOCIATED ARTICLES AND METHODS"; U.S. Publication No. US-2020-0220197-A1 published Jul. 9, 2020, filed as U.S. application Ser. No. 16/724,612 on Dec. 23, 2019, and entitled "FOLDED ELECTROCHEMICAL DEVICES AND ASSOCIATED METHODS AND SYSTEMS", U.S. Publication No. US-2020-0373578-A1 published Nov. 26, 2020, filed as U.S. application Ser. No. 16/879,861 on May 21, 2020, and entitled "ELECTROCHEMICAL DEVICES INCLUDING POROUS LAYERS", U.S. Publication No. US-2020-0373551-A1 published Nov. 26, 2020, filed as U.S. application Ser. No. 16/879,839 on May 21, 2020, and entitled "ELECTRICALLY COUPLED ELECTRODES, AND ASSOCIATED ARTICLES AND METHODS", U.S. Publication No. US-2020-0395585-A1 published Dec. 17, 2020, filed as U.S. application Ser. No. 16/057,050 on Aug. 7, 2018, and entitled "LITHIUM-COATED SEPARATORS AND ELECTROCHEMICAL CELLS COMPRISING THE SAME", U.S. Publication No. US-2021-0057753-A1 published Feb. 25, 2021, filed as U.S. application Ser. No. 16/994,006 on Aug. 14, 2020, and entitled "ELECTROCHEMICAL CELLS AND COMPONENTS COMPRISING THIOL GROUP-CONTAINING SPECIES", U.S. Publication No. US-2021-0135297-A1 published on May 6, 2021, filed as U.S. application Ser. No. 16/670,905 on Oct. 31, 2019, and entitled SYSTEM AND METHOD FOR OPERATING A RECHARGEABLE ELECTROCHEMICAL CELL OR BATTERY", U.S. Publication No. US-2021-0138673-A1 published on May 13, 2021, filed as U.S. application Ser. No. 17/089,092 on Nov. 4, 2020, and entitled "ELECTRODE CUTTING INSTRUMENT", U.S. Publication No. US-2021-0135294-A1 published on May 6, 2021, filed as U.S. application Ser. No. 16/670,933 on Oct. 31, 2019, patented as U.S. Pat. No. 11,056,728 on Jul. 6, 2021 and entitled "SYSTEM AND METHOD FOR OPERATING A RECHARGEABLE ELECTROCHEMICAL CELL OR BATTERY"; U.S. Publication No. US-2021-0151839-A1 published on May 20, 2021, filed as U.S. application Ser. No. 16/952,177 on Nov. 19, 2020, and entitled "BATTERIES, AND ASSOCIATED SYSTEMS AND METHODS"; U.S. Publication No. US-2021-0151830-A1 published on May 20, 2021, filed as U.S. application Ser. No. 16/952,235 on Nov. 19, 2020, and entitled "BATTERIES WITH COMPONENTS INCLUDING CARBON FIBER, AND ASSOCIATED SYSTEMS AND METHODS"; U.S. Publication No. US-2021-0151817-A1 published on May 20, 2021, filed as U.S. application Ser. No. 16/952,228 on Nov. 19, 2020, and entitled "BATTERY ALIGNMENT, AND ASSOCIATED SYSTEMS AND METHODS"; U.S. Publication No. US-2021-0151841-A1 published on May 20, 2021, filed as U.S. application Ser. No. 16/952,240 on Nov. 19, 2020, and entitled "SYSTEMS AND METHODS FOR APPLYING AND MAINTAINING COMPRESSION PRESSURE ON ELECTROCHEMICAL CELLS"; U.S. Publication No. US-2021-0151816-A1 published on May 20, 2021, filed as U.S. application Ser. No. 16/952,223 on Nov. 19, 2020, and entitled "THERMALLY INSULATING COMPRESSIBLE COMPONENTS FOR BATTERY PACKS"; U.S. Publication No. US-2021-0151840-A1 published on May 20, 2021, filed as U.S. application Ser. No. 16/952,187 on Nov. 19, 2020, and entitled "COMPRESSION SYSTEMS FOR BATTERIES"; U.S. Publication No. US-2021-0193984-A1 published on Jun. 24, 2021, filed as U.S. application Ser. No. 17/125,124 on Dec. 17, 2020, and entitled "SYSTEMS AND METHODS FOR FABRICATING LITHIUM METAL ELECTRODES"; U.S. Publication No. US-2021-0193985-A1 published on Jun. 24, 2021, filed as U.S. application Ser. No. 17/125,110 on Dec. 17, 2020, and entitled "LITHIUM METAL ELECTRODES AND METHODS"; U.S. Publication No. US-2021-0193996-A1 published on Jun. 24, 2021, filed as U.S. application Ser. No. 17/125,070 on Dec. 17, 2020, and entitled "LITHIUM METAL ELECTRODES"; U.S. Publication No. US-2021-0194069-A1 published on Jun. 24, 2021, filed as U.S. application Ser. No. 17/126,390 on Dec. 18, 2020, and entitled "SYSTEMS AND METHODS FOR PROVIDING, ASSEMBLING, AND MANAGING INTEGRATED POWER BUS FOR RECHARGEABLE ELECTROCHEMICAL CELL OR BATTERY".

EXAMPLES

Example 1

Example 1 generally relates to methods of determining a critical amount of an aromatic hydrocarbon solvent at which phase transition of the electrolyte occurs, in accordance with some embodiments.

Below is a description of a study on solvent induced or composition induced phase separation. This phenomenon may be caused by addition of non-solvent (e.g., an aromatic hydrocarbon solvent) to a homogenous mixture (e.g., organic solvent with salt) when a certain non-solvent amount was added, e.g., resulting in the formation of two immiscible liquid layers. The most common determination of miscibility is by visual evaluation. For instance, if two substances could form separate layers, the two substances would be considered immiscible. Miscibility of two materials could also be determined optically. When two miscible liquids are combined, the resulting liquid is clear. If the mixture is cloudy the two materials are immiscible. Cloudiness or turbidity could be measured with Nephelometer. For instance, a turbidity value increase of greater than 5 to 10 times relative to the starting turbidity value of the homogeneous mixture may indicate that a liquid-liquid phase separation has occurred.

The method of determining a critical amount of an aromatic hydrocarbon solvent that induces phase separation was adapted from Gupta et. al., Liquid-Liquid Extraction Using the Composition-Induced Phase Separation Process, Ind. Eng. Chem. Res. 1996, 35, 2360-2368. Specifically, the critical amount of an aromatic hydrocarbon solvent that leads to electrolyte phase transition/separation was determined through addition of an aromatic hydrocarbon solvent having low salt solubility to a solution of salt in organic solvent (e.g., carbonate solvent or mixture of carbonate solvents).

Figures 4A, 4B:
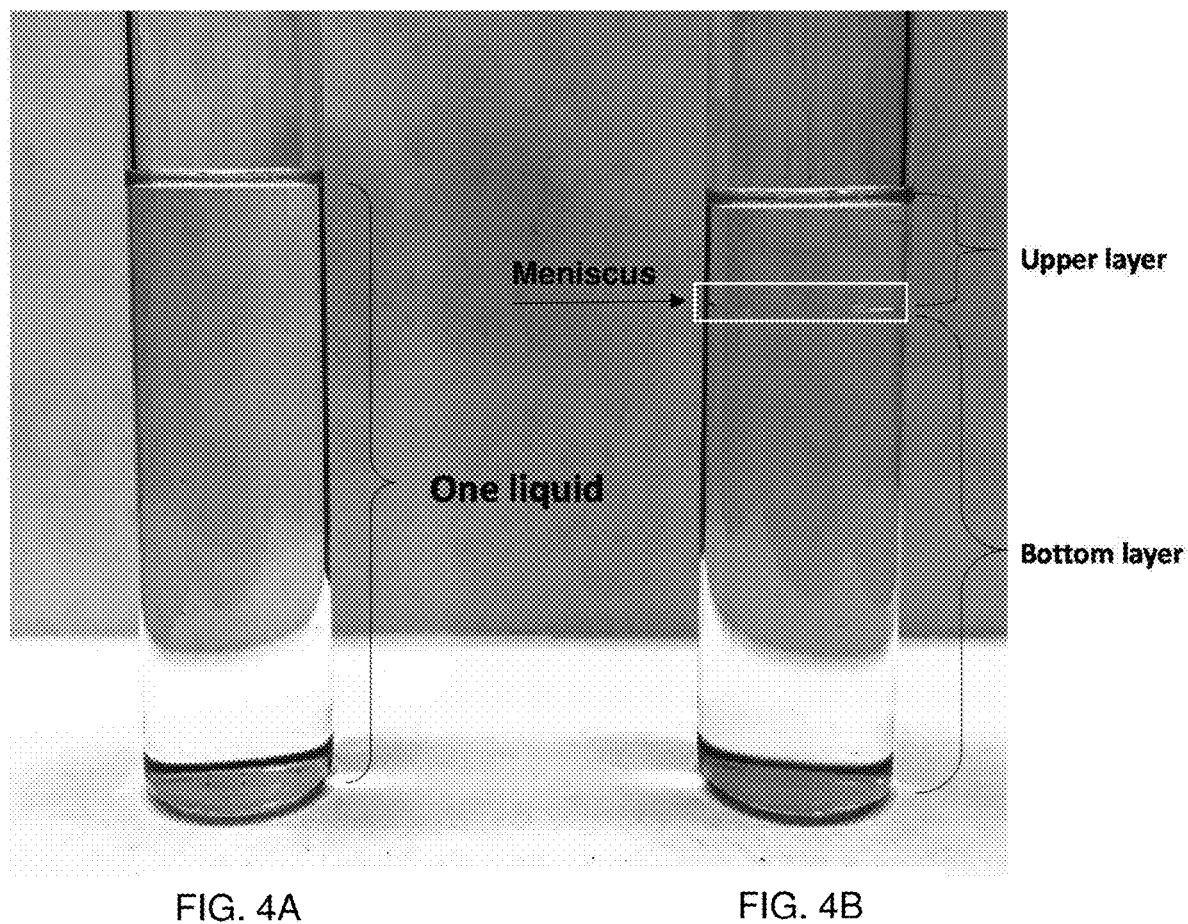
FIGS. 4A-4B are images visually illustrating two electrolyte compositions that gives rise to a homogeneous electrolyte (FIG. 4A) and a heterogeneous electrolyte (FIG. 4B), in accordance with some embodiments.

The starting electrolyte solution comprising salt in organic solvent was a homogeneous clear liquid. FIG. 4A shows an example of a homogeneous clear liquid. An aromatic hydrocarbon solvent was then added at increments (e.g., dropwise) to the electrolyte solution while under constant stirring until the solution became visually cloudy or turbid. When the stirring stopped, the turbid electrolyte solution separated into two liquid layers to reach a thermodynamically stable configuration. FIG. 4B shows an example of two liquid layers of immiscible liquids phase separated from an electrolyte solution, e.g., with an upper layer relatively rich in aromatic hydrocarbon solvent and relatively poor in salt, and a bottom layer relatively rich in organic solvent and relatively rich in salt. As shown in FIG. 4B, a meniscus was observed between two immiscible liquids layers (e.g., between the upper layer and bottom layer as shown) as a result of phase separation. An onset of mixture turbidity or appearance of two visually observable immiscible liquid layers was an indication that the mixture experienced phase transition from one phase of homogeneous clear liquid into two immiscible liquids or a two phased system. In addition to visually observable turbidity change or formation of two immiscible liquid phases, the turbidity level was also experimentally measured using a Nephelometer (e.g., as shown in Table 2).

A detailed step by step procedure for determining a critical amount of hydrocarbon, e.g., that induces phases separation or immiscibility in the electrolyte, was performed for an electrolyte comprising lithium bis(fluorosulfonyl) imide (LiFSI), fluoroethylene carbonate (FEC), and α, α, α-trifluorotoluene (TFT), at a temperature of 20° C. Specifically, the critical amount of aromatic hydrocarbon salt, e.g., α, α, α-trifluorotoluene (TFT), was determined for the electrolyte, as shown in Table 1.

Initially, the starting electrolyte solution of 2 g of LiSFI salt dissolved in 11.72 g of FEC was a clear homogeneous liquid (Step #0 in Table 1). The electrolyte solution remained as one clear homogeneous liquid until Step #5 when a total of 1.65 g of TFT had been added, both during stirring and after stirring had stopped. However, at Step #6, when the total weight of TFT had been increased to 1.68 g, a phase transition occurred where the electrolyte solution became turbid under stirring (e.g., in the form of an emulsion) or showed two layers of immiscible liquids when the stirring had stopped.

A critical amount (wt % based on the total weight of the electrolyte composition) of aromatic hydrocarbon solvent, e.g., TFT, that induces phase transition of the electrolyte, could then be calculated. The critical amount of aromatic hydrocarbon solvent was calculated as an average weight % of TFT in Step #5 and #6. The corresponding LiFSI and FEC concentrations were also calculated as an average weight % between Steps #5 and #6. For this particular study, the critical amount of TFT at which phase transition occurs was calculated to be 10.8 wt %, along with 76.2 wt % FEC and 13 wt % of LiFSI in the electrolyte.

TABLE 1

Step by step process for inducing separation in a ternary mixture of LiFSI-FEC-TFT

| | Components weight (g) | | | Components (wt %) | | | Visual Observations | |
|---|---|---|---|---|---|---|---|---|
| | | | | | | | Mixture | Mixture |
| Step No. | LiFSI | FEC | TFT | LiFSI | FEC | TFT | Condition (with stirring) | Condition (no stirring) |
| 0 | 2.0 | 11.72 | 0 | 14.6 | 85.4 | 0.0 | Clear | One clear liquid |
| 1 | 2.0 | 11.72 | 1.02 | 13.6 | 79.5 | 6.9 | Clear | One clear liquid |
| 2 | 2.0 | 11.72 | 1.44 | 13.2 | 77.3 | 9.5 | Clear | One clear liquid |
| 3 | 2.0 | 11.72 | 1.59 | 13.1 | 76.6 | 10.4 | Clear | One clear liquid |
| 4 | 2.0 | 11.72 | 1.62 | 13.0 | 76.4 | 10.6 | Clear | One clear liquid |
| 5 | 2.0 | 11.72 | 1.65 | 13.0 | 76.3 | 10.7 | Clear | One clear liquid |
| 6 | 2.0 | 11.72 | 1.68 | 13.0 | 76.1 | 10.9 | Turbid | Two liquid layers |

Example 2

Example 2 generally relates to the effect of salt on phase transition of an electrolyte comprising an aromatic hydrocarbon solvent, in accordance with some embodiments. It should be noted that the critical amount of an aromatic hydrocarbon solvent at which phase transition of the electrolyte occurred was determined to be a function of salt to organic solvent ratio.

Comparative example 2. The electrolyte included 21 wt % of α,α,α-trifluorotoluene (TFT) and 79 wt % of fluoroethylene carbonate (FEC).

Example 2. The electrolyte included 21 w % of α,α,α-trifluorotoluene (TFT), 13 wt % of LiFSI and 66 wt % of fluoroethylene carbonate (FEC).

Comparative Example 2 and Example 2 were performed to illustrate that the critical amount of α,α,α-trifluorotoluene (TFT) (i.e., a phase transition concentration) at which phase transition of the electrolyte occurred was a function of LiFSI to FEC ratio. For instance, without the addition of salts, for a binary mixture of FEC and TFT, the TFT phase transition concentration was determined to be 22.3 wt % using the method described in Example 1. When the amount of TFT was below 22.3 wt %, the binary electrolyte mixture was a clear and homogeneous single phase system. For example, Comparative Example 2 shows that when the binary electrolyte mixture had 21 wt % of TFT and 79 wt % of FEC, the electrolyte was a clear and homogeneous single phase system (FIG. 4A). However, when salt was added, the single phase system transitioned into a two phase system. For instance, Example 2 shows that when 13 wt % of LiFSI was present in the mixture containing 21 wt % of TFT, phase transition occurred and the system showed two distinct liquid layers (FIG. 4B) because the addition of salt had shifted (e.g., decreased) the critical TFT phase transition concentration, e.g., facilitating an onset of electrolyte phase separation.

Turbidity measurements were also performed for Comparative Example 2 and Example 2 while the samples were subjected to constant stirring. In Example 2, the turbidity measurement was performed directly after stirring or shaking the mixture for 5 to 10 seconds. As shown in Table 2, MiliQ water was used as a reference sample for turbidity measurement of a clear homogeneous one phase liquid. As shown, the turbidity measurement of the electrolyte in Comparative Example 2 was similar to that of the reference sample, confirming the visual observation in FIG. 4A that Comparative Example 2 comprised of a clear homogeneous one phase liquid. On the other hand, the turbidity measurement of Example 2 showed a sharp turbidity increase from Comparative Example 2, indicating that phase transition (i.e., phase separation) had occurred. The high turbidity measurement of Example 2 confirmed the visual observation that phase transition had occurred and that the electrolyte system included a two phase immiscible liquid system as its thermodynamically stable state, as shown in FIG. 4B.

TABLE 2

Turbidity data for homogeneous electrolyte versus heterogeneous electrolyte

| Sample ID | Turbidity (NTU) | Visual Observations (no stirring) |
|---|---|---|
| Reference sample: MilliQ water | 0.31 | Reference liquid |
| Comparative Example 2: 21% TFT, 79% FEC | 0.40 | One liquid |
| Example 2: 13% LiFSI, 21% TFT, 66% FEC | 145 | Two immiscible liquids |

Examples 3-4

Examples 3 and 4 generally relate to the determination of a critical amount of an aromatic hydrocarbon solvent at which phase transition of the electrolyte occurs, i.e., a phase transition concentration, for several sets of electrolyte compositions, in accordance with certain embodiments.

As discussed in previous examples, the critical amount of aromatic hydrocarbon, i.e., phase transition concentration, was a function of salt to organic solvent ratio, and could be determined using visual observation and/or turbidity measurements. For the electrolytes in Example 3 and 4, the aromatic hydrocarbon phase transition concentration for two sets of electrolytes were evaluated at various salt to organic solvent ratio and presented in Table 3 and 4 respectively.

Example 3. The electrolyte comprised α,α,α-trifluorotoluene (TFT), lithium bis(fluorosulfonyl)imide (LiFSI), and fluoroethylene carbonate (FEC). The critical amount of α,α,α-trifluorotoluene (TFT) that induced phase transition was determined for 18 different LiFSI:FEC ratios. Result is presented in Table 3.

Example 4. The electrolyte comprised fluorobenzene (FB), lithium bis(fluorosulfonyl)imide (LiFSI), and fluoroethylene carbonate (FEC). The critical amount of fluorobenzene (FB) that induced phase transition was determined for 13 different LiFSI:FEC ratios. Result is presented in Table 4.

TABLE 3

FEC-LiFSI-TFT ternary mixture

| Ratio No. | FEC (wt %) | LiFSI (wt %) | TFT phase transition concentration (wt %) |
|---|---|---|---|
| 1 | 75.0 | 18.7 | 6.3 |
| 2 | 75.0 | 16.2 | 8.8 |
| 3 | 76.2 | 13.0 | 10.8 |
| 4 | 79.1 | 9.5 | 11.4 |
| 5 | 78.4 | 9.3 | 12.3 |
| 6 | 79.7 | 8.4 | 11.9 |
| 7 | 80.0 | 8.0 | 11.9 |
| 8 | 80.7 | 6.3 | 13.0 |
| 9 | 82.2 | 4.4 | 13.4 |
| 10 | 81.4 | 4.1 | 14.5 |
| 11 | 80.9 | 3.9 | 15.1 |
| 12 | 80.9 | 3.8 | 15.4 |
| 13 | 81.1 | 3.6 | 15.3 |
| 14 | 80.9 | 3.3 | 15.7 |
| 15 | 81.5 | 3.0 | 15.4 |
| 16 | 80.7 | 2.7 | 16.6 |
| 17 | 80.7 | 2.5 | 16.7 |
| 18 | 77.7 | 0.0 | 22.3 |

Figure 5:
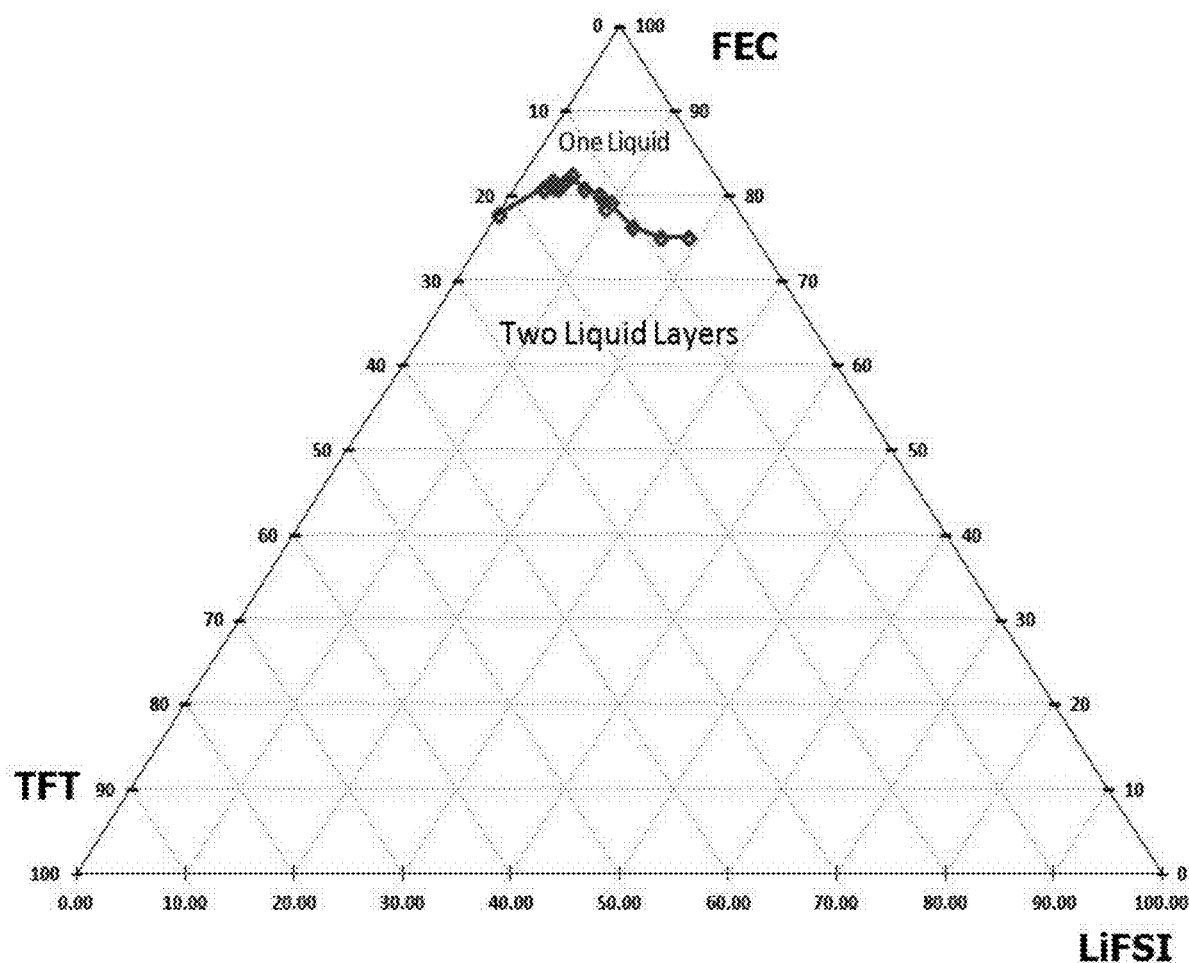
FIG. 5 is a graph illustrating a tertiary phase diagram for an electrolyte comprising α, α, α-trifluorotoluene (TFT), fluoroethylene carbonate (FEC), and a lithium salt (LiFSI), in accordance with some embodiments.

As shown Table 3, the TFT phase transition concentration varied with different LiFSI to FEC ratios. The data points in Table 3 were plotted in a ternary phase diagram depicting the composition at which the electrolyte system underwent phase transition. As shown in FIG. 5, the 18 compositions from Table 3 were plotted for the three-component system of LiFSI—FEC—TFT from Example 3. As shown, the data points were connected to form a phase transition line in the ternary phase diagram. The phase transition line separated the two-liquid phase region comprising two immiscible layers (e.g., composition below the phase transition line) from the homogeneous single liquid phase region (e.g., compositions above the phase transition line).

TABLE 4

FEC-LiFSI-fluorobenzene ternary mixture

| Ratio No. | FEC (wt %) | LiFSI (wt %) | Fluorobenzene phase transition concentration (wt %) |
|---|---|---|---|
| 1 | 59.0 | 6.4 | 34.6 |
| 2 | 57.6 | 6.6 | 35.8 |
| 3 | 57.9 | 6.7 | 35.4 |
| 4 | 58.3 | 8.1 | 33.6 |
| 5 | 61.6 | 8.8 | 29.6 |
| 6 | 61.8 | 9.9 | 28.3 |
| 7 | 62.6 | 10.7 | 26.7 |
| 8 | 62.6 | 11.9 | 25.5 |
| 9 | 63.6 | 12.7 | 23.7 |
| 10 | 62.0 | 17.5 | 20.5 |
| 11 | 61.6 | 18.4 | 20.0 |
| 12 | 56.6 | 26.7 | 16.7 |
| 13 | 53.5 | 35.7 | 10.8 |

Figure 6:
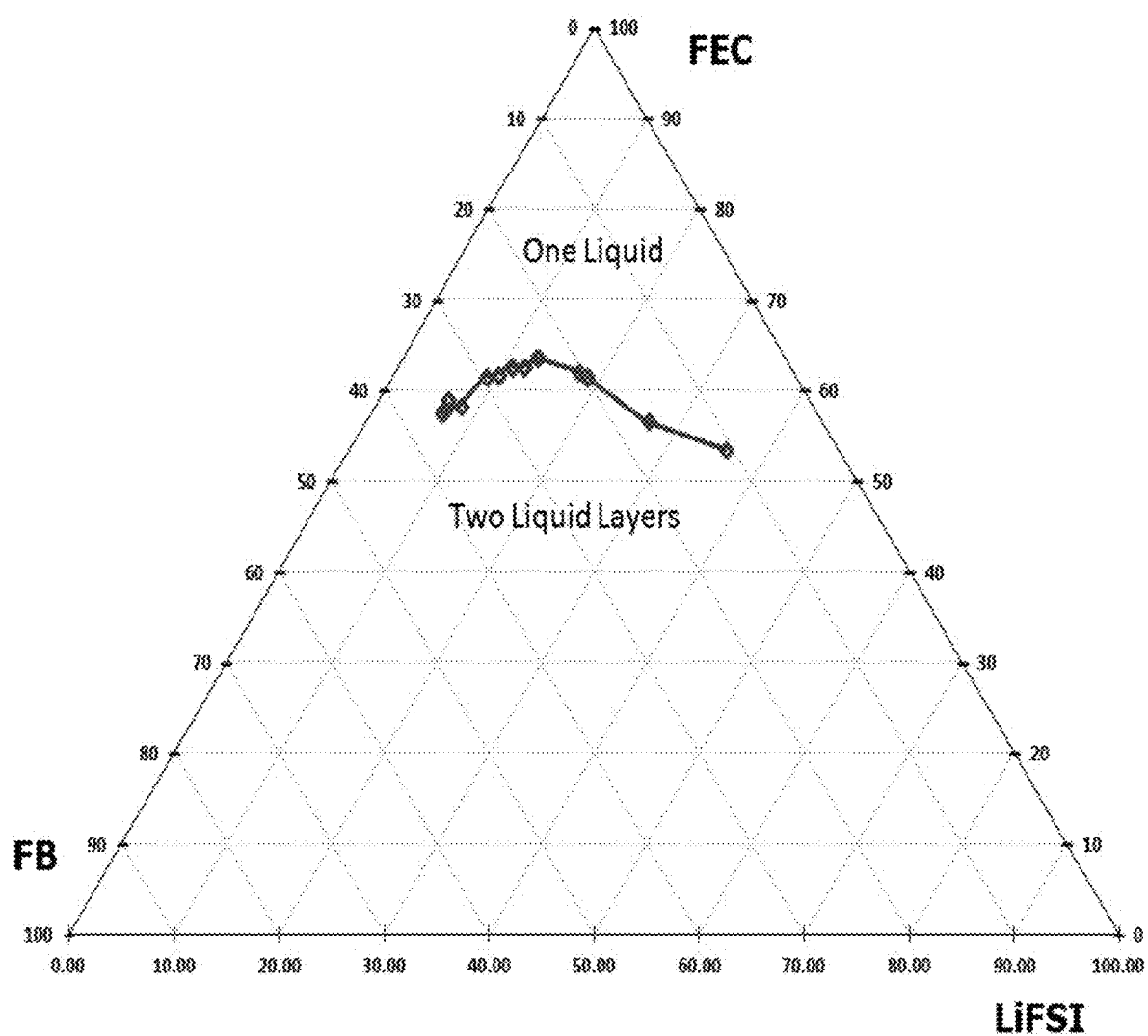
FIG. 6 is a graph illustrating a tertiary phase diagram for an electrolyte comprising fluorobenzene (FB), fluoroethylene carbonate (FEC), and a lithium salt (LiFSI), in accordance with some embodiments.

For Example 4, the fluorobenzene (FB) phase transition concentration was measured at different LiFSI:FEC ratios (as shown in Table 4). As shown, the fluorobenzene (FB) phase transition concentration varied with different LiFSI to FEC ratio. The data points for the three-component system of LiFSI—FEC—fluorobenzene in Table 4 were plotted in a ternary phase diagram as shown in FIG. 6. As shown, the data points were connected to form phase transition concentration line in the ternary phase diagram that separated two liquid phases region comprising two immiscible layers from homogeneous single liquid phase region.

In accordance with some embodiments, it may be beneficial to use an aromatic hydrocarbon in an electrolyte composition at an amount that deviates no more from a percentage, e.g., no more than 40 wt %, from a critical amount of aromatic hydrocarbon that induces electrolyte phase transition. It should be noted that every single point on the phase transition line in FIGS. 5-6 represents a critical amount of aromatic hydrocarbon at a specific salt to organic solvent ratio. Accordingly, in some embodiments it may be beneficial to choose a composition comprising an aromatic hydrocarbon at an amount that deviates no more than 40 wt % from a critical amount of aromatic hydrocarbon on the phase transition line, as will be shown in the following examples. Such deviation can be visualized in the ternary diagrams above as a deviation from the line separating two phase region from homogenous liquid region. As will be shown in the following examples, deviation from hydrocarbon phase transition concentration in the electrolyte mixture had a direct impact on cycle life.

Examples 5-14

In Examples 5-14 and Comparative Examples 5-9, unless otherwise stated, the electrochemical cells were prepared by the following methods: the first electrode (anode) was Li foil (thickness of 50 µm. The porous separator was a 9 µm-thick polyolefin film, and the second electrode (cathode) was nickel manganese cobalt (NCM811) coated on a 15 µm-thick aluminum substrate current collector with an active cathode material (ACM) loading of approximately 6.2 mg/cm$^2$ on each side of the current collector. The above components were assembled in a stacked layered structure of anode/separator/cathode/separator/anode. The total active cathode surface area was 99.4 cm$^2$. After sealing the cell components in a foil pouch, an appropriate amount of electrolyte was added (typically, 0.5 mL was used). The cell package was then vacuum sealed. These cells were allowed to soak in the electrolyte for 24 hours unrestrained.

Comparative Examples 5-9 comprise electrolytes either without any aromatic hydrocarbon solvent, or with a third solvent that is a non-aromatic hydrocarbon solvent. Examples 5-14 comprise electrolyte with aromatic hydrocarbon solvent. Each of the electrolyte compositions in Examples 1-10 and Comparative Examples 1-5 mixtures had a salt amount of about 1M in concentration, corresponding to a salt amount (measured as a weight percent of salt relative to the total weight of the electrolyte) of between 9.5-13 w %, depending on the type of salt. The specific composition in weight percent with respect to the total electrolyte weight for each sample is tabulated in Table 1. In addition to the composition, the appearance of each electrolyte before performing cycling experiments were monitored and recorded in Table 5.

Comparative Example 5: The above cell was prepared with an electrolyte containing lithium hexafluorophosphate (LiPF6) in an organic solvent mixture of fluoroethylene carbonate (FEC) and dimethyl carbonate (DMC) at a LiPF$_6$:FEC:DMC weight ratio of 12.4 wt %:17.5 wt %: 70.1 wt %.

Comparative Example 6: The above cell was prepared with an electrolyte containing lithium bis(fluorosulfonyl) imide (LiFSI) in an organic solvent mixture of fluroethylene carbonate (FEC) and dimethyl carbonate (DMC). Additionally, a third solvent, e.g., 1, 4-dioxane, that does not belong to formula (I) was added. The electrolyte comprises LiFSI:FEC:DMC:1,4-dioxane at a weight ratio of 13.0 wt %:31.7 wt %:20.0 wt %:35.3 wt %.

Comparative Example 7: The above cell was prepared with an electrolyte containing lithium bis(fluorosulfonyl) imide (LiFSI) in an organic solvent mixture of fluoroethylene carbonate (FEC) to dimethyl carbonate (DMC). A third solvent, e.g., benzonitrile, that does not belong to formula (I) was added. The electrolyte comprises LiFSI:FEC:DMC:benzonitrile at a weight ratio of 13.0 wt %:31.7 wt %:20.0 wt %:35.3 wt %.

Comparative Example 8: The above cell was prepared with an electrolyte containing lithium bis(fluorosulfonyl) imide (LiFSI) in an organic solvent mixture of fluoroethylene carbonate (FEC) to dimethyl carbonate (DMC). A third solvent, e.g., tetrahydropyrane, that does not belong to formula (I), was added. The electrolyte comprises a LiFSI:FEC:DMC:tetrahydropyrane at a weight ratio of 13.0 wt %:31.7 wt %:20.0 wt %:35.3 wt %.

Comparative Example 9: The above cell was prepared with an electrolyte containing lithium bis(fluorosulfonyl) imide (LiFSI) in an organic solvent mixture of fluoroethylene carbonate (FEC) to dimethyl carbonate (DMC). A third solvent, e.g., nitrobenzene, that does not belong to formula (I), was added. The electrolyte comprises LiFSI:FEC:DMC:nitrobenzene at a weight ratio of 13.0 wt %:31.7 wt %:20.0 wt %:35.3 wt %.

Example 5: The above cell was prepared with an electrolyte containing lithium hexafluorophosphate (LiPF$_6$) in an organic solvent mixture of fluoroethylene carbonate (FEC) to dimethyl carbonate (DMC). An aromatic hydrocarbon solvent, e.g., α, α, α-trifluorotoluene (TFT), was added. The electrolyte comprises LiPF$_6$:FEC:DMC:TFT at a weight ratio of 12.4 wt %:13.7 wt %:63.9 wt %:10.0 wt %.

Example 6: The above cell was prepared with an electrolyte containing lithium hexafluorophosphate (LiPF$_6$) in an organic solvent mixture of fluoroethylene carbonate (FEC) to dimethyl carbonate (DMC). An aromatic hydrocarbon solvent, e.g., α, α, α-trifluorotoluene (TFT), was added. The electrolyte comprises LiPF$_6$:FEC:DMC:TFT at a weight ratio of 10.3 wt %:16.7 wt %:16.7 wt %:56.3 wt %.

Example 7: The above cell was prepared with an electrolyte containing lithium bis(fluorosulfonyl)imide (LiFSI) in an organic solvent mixture of fluoroethylene carbonate (FEC) to dimethyl carbonate (DMC). An aromatic hydrocarbon solvent, e.g., α, α, α-trifluorotoluene (TFT), was added. The electrolyte comprises LiFSI:FEC:DMC:TFT at a weight ratio of 10.3 wt %:16.7 wt %:30.0 wt %:43.0 wt %.

Example 8: The above cell was prepared containing the same components as Example 7, but at different amounts. The electrolyte comprises LiFSI:FEC:DMC:TFT at a weight ratio of 13.0 wt %:16.2 wt %:16.2 wt %:54.7 wt %.

Example 9: The above cell was prepared containing the same components as Example 7, but at different amounts. The electrolyte comprises LiFSI:FEC:DMC:TFT at a weight ratio of 13.0 wt %:31.7 wt %:20.0 wt %:35.3 wt %.

Example 10: The above cell was prepared containing the same components as Example 7, but at different amounts. The electrolyte comprises LiFSI:FEC:DMC:TFT at a weight ratio of 13.0 wt %:31.7 wt %:10.0 wt %:45.3 wt %.

Example 11: The above cell was prepared containing the same components as Example 7, but at different amounts.

The electrolyte comprises LiFSI:FEC:DMC:TFT at a weight ratio of 13.0 wt %:40.0 wt %:20.0 wt %:27.0 wt %.

Example 12: The above cell was prepared containing the same components as Example 7, but at different amounts. The electrolyte comprises LiFSI:FEC:DMC:TFT at a weight ratio of 13.0 wt %:31.7 wt %:25.0 wt %:30.3 wt %.

Example 13: The above cell was prepared containing the same components as Example 7, but at different amounts. The electrolyte comprises LiFSI:FEC:DMC:TFT at a weight ratio of 9.6 wt %:45.4 wt %:11.8 wt %:33.3 wt %.

Example 14: The above cell was prepared with an electrolyte containing lithium bis(fluorosulfonyl)imide (LiFSI) in an organic solvent mixture of fluroethylene carbonate (FEC) to dimethyl carbonate (DMC). An aromatic hydrocarbon solvent, e.g., benzene, was added. The electrolyte comprises LiFSI:FEC:DMC:benzene at a weight ratio of 13.0 wt %:31.7 wt %:20.0 wt %:35.3 wt %.

TABLE 5

Composition of various solvent systems

| Example | Salt | Salt (wt %) | FEC (wt %) | DMC (wt %) | Third solvent | Third solvent (wt %) | Electrolyte appearance |
|---|---|---|---|---|---|---|---|
| Comparative Example 5 | LiPF6 | 12.4 | 17.5 | 70.1 | None | None | One phase |
| Comparative Example 6 | LiFSI | 13.0 | 31.7 | 20.0 | 1,4-Dioxane | 35.3 | One phase |
| Comparative Example 7 | LiFSI | 13.0 | 31.7 | 20.0 | Benzonitrile | 35.3 | One phase |
| Comparative Example 8 | LiFSI | 13.0 | 31.7 | 20.0 | Tetrahydropyrane | 35.3 | One phase |
| Comparative Example 9 | LiFSI | 13.0 | 31.7 | 20.0 | Nitrobenzene | 35.3 | One phase |
| Example 5 | LiPF6 | 12.4 | 13.7 | 63.9 | TFT | 10.0 | One phase |
| Example 6 | LiPF6 | 10.3 | 16.7 | 16.7 | TFT | 56.3 | Two phase |
| Example 7 | LiFSI | 10.3 | 16.7 | 30.0 | TFT | 43.0 | One phase |
| Example 8 | LiFSI | 13.0 | 16.2 | 16.2 | TFT | 54.7 | One phase |
| Example 9 | LiFSI | 13.0 | 31.7 | 20.0 | TFT | 35.3 | One phase |
| Example 10 | LiFSI | 13.0 | 31.7 | 10.0 | TFT | 45.3 | Two phase |
| Example 11 | LiFSI | 13.0 | 40.0 | 20.0 | TFT | 27.0 | One phase |
| Example 12 | LiFSI | 13.0 | 31.7 | 25.0 | TFT | 30.3 | One phase |
| Example 13 | LiFSI | 9.6 | 45.4 | 11.8 | TFT | 33.3 | One phase |
| Example 14 | LiFSI | 13.0 | 31.7 | 20.0 | Benzene | 35.3 | One phase |

Effect of Aromatic Hydrocarbon on Cycle Life

Cycle life was determined for each of electrochemical cell in Examples 5-14 and Comparative Examples 1-5 by performing electric tests. During electric test, each of the electrochemical cells was subjected to 12 kg/cm² of pressure. Electric tests were performed at a charge current of 75 mA to 4.4 V and discharge current of 300 mA to 3.0 V. The electrochemical cells had an initial cells capacity of 118 mAh. The electrochemical cells were cycled to a cutoff capacity of 70 mAh and cycle life was determined at this point. The cycle life of each electrochemical cell is presented in Table 6.

TABLE 6

Effect of aromatic hydrocarbon solvent of formula I on cycle life of a battery

| Example | Third solvent | Aromatic hydrocarbon solvent (wt %) | Cycle Life | Critical amount of aromatic hydrocarbon solvent (wt %) | Deviation from critical concentration (wt %) |
|---|---|---|---|---|---|
| Comparative Example 5 | None | N/A | 433 | miscible | N/A |
| Comparative Example 6 | 1,4-Dioxane | N/A | 407 | miscible | N/A |
| Comparative Example 7 | Benzonitrile | N/A | 212 | miscible | N/A |
| Comparative Example 8 | Tetrahydropyrane | N/A | 265 | miscible | N/A |
| Comparative Example 9 | Nitrobenzene | N/A | 82 | miscible | N/A |
| Example 5 | TFT | 11.4% | 494 | 50.9% | −39.5% |
| Example 6 | TFT | 62.8% | 672 | 50.9% | 11.9% |
| Example 7 | TFT | 47.9% | 454 | 83.9% | −36.0% |
| Example 8 | TFT | 62.8% | 678 | 80.8% | −18.0% |
| Example 9 | TFT | 40.6% | 852 | 45.2% | −4.6% |
| Example 10 | TFT | 52.1% | 749 | 36.8% | 15.2% |

TABLE 6-continued

Effect of aromatic hydrocarbon solvent of formula I on cycle life of a battery

| Example | Third solvent | Aromatic hydrocarbon solvent (wt %) | Cycle Life | Critical amount of aromatic hydrocarbon solvent (wt %) | Deviation from critical concentration (wt %) |
|---|---|---|---|---|---|
| Example 11 | TFT | 31.0% | 822 | 36.0% | −5.0% |
| Example 12 | TFT | 34.8% | 775 | 36.8% | −2.0% |
| Example 13 | TFT | 36.8% | 918 | 36.9% | −0.1% |
| Example 14 | Benzene | 40.6% | 752 | 42.5% | −1.9% |

As shown in Table 6, the batteries comprising an aromatic hydrocarbon solvent of formula (I), e.g., benzene or α, α, α-trifluorotoluene, in the electrolyte showed enhanced cycle life (Examples 5-14) compared to the battery without aromatic hydrocarbon solvent in the electrolyte (Comparative Example 5). The batteries comprising a third solvent that was not an aromatic hydrocarbon solvent of formula (I) also did not exhibit enhanced cycle life (Comparative Examples 6-9). In some cases, the third solvent (1,4-dioxane, benzonitrile, tetrahydropyrane, nitrobenzene) that was not an aromatic hydrocarbon solvent of formula (I) lead to reduced cycle life (Comparative Examples 2-4) compared to the battery without a third solvent (Comparative Example 1). In fact, benzonitrile and nitrobenzene were aromatic solvents with —CN and —$NO_2$ groups. However, these compounds were completely miscible with other solvents and salt and did not form two layered mixtures. This indicated that the potential immiscibility or phase separation of the mixture may be considered for cycle life improvement. These examples show that compared to electrolytes without aromatic hydrocarbon solvent or with an added third solvent that is not an aromatic hydrocarbon solvent of formula (I), the addition of an aromatic hydrocarbon solvent of formula (I) may lead to improved cycle life.

As shown in Table 6, when the electrolyte contained the same components (LiFSI, FEC, DMC, and aromatic hydrocarbon solvent TFT) as shown in Examples 5-13, a difference in the relative amounts of individual components (as shown in Table 6) in the electrolyte may affect the cycle lifetime. For instance, while the electrochemical cell in Example 13 showed a maximum cycle lifetime of 918, the electrochemical cell in Example 5 showed a cycle lifetime of 494. Experiments were performed to analyze this difference and correlation between electrolyte composition and cycle lifetime were drawn based on experimental data.

Without wishing to be bound by theory, it was hypothesized that a selection of an electrolyte system and/or composition with potential immiscibility could lead to improved cycle life. This potential immiscibility, e.g., a phase separation point, may exist in electrolytes comprising an aromatic hydrocarbon solvent of formula (I). The critical amount of aromatic hydrocarbon solvent in each of Examples 5-14 and Comparative Examples 5-9 were determined using methods outlined in Example 1. Specifically, to determine whether a critical concentration (i.e., phase transition concentration) of aromatic hydrocarbon solvent existed, the corresponding third solvent or aromatic hydrocarbon solvent was added dropwise at increments to the corresponding salt and organic solvent mixture in each example and comparative example. The critical concentration of the aromatic hydrocarbon solvent was measured as the concentration at which the electrolyte undergoes a phase transition from a 1-phase to a 2-phase system. It should be noted that the wt % of aromatic hydrocarbon solvent in Table 6 was calculated with respect to the total weight of aromatic hydrocarbon solvent and organic solvent in the electrolyte.

After determining the critical amount (in wt %) of aromatic hydrocarbon solvent that gave rise to a phase separation of the electrolyte from each example, the actual amount of aromatic hydrocarbon solvent used in Examples 5-14 was compared to the critical amount and a percent deviation (wt %) from the critical amount was calculated (Table 6).

As shown in Table 6, the electrolytes in Comparative Examples 5-9 did not comprise any aromatic hydrocarbon solvent of formula (I) and were completely miscible at all compositions. Therefore, a deviation from a critical amount of aromatic hydrocarbon could not be calculated. The electrolytes comprising an aromatic hydrocarbon, on the other hand, had the potential to phase separate, or become immiscible, at a critical concentration of aromatic hydrocarbons (Examples 5-14). The actual amount of aromatic hydrocarbon solvent of formula (I) used was compared to the critical concentration, and deviation from the critical concentration was calculated by subtracting the actual amount of aromatic hydrocarbon used in each of Examples 5-14 by the experimentally determined critical concentration of aromatic hydrocarbon for Examples 5-14 and presented in Table 6.

Figure 7:
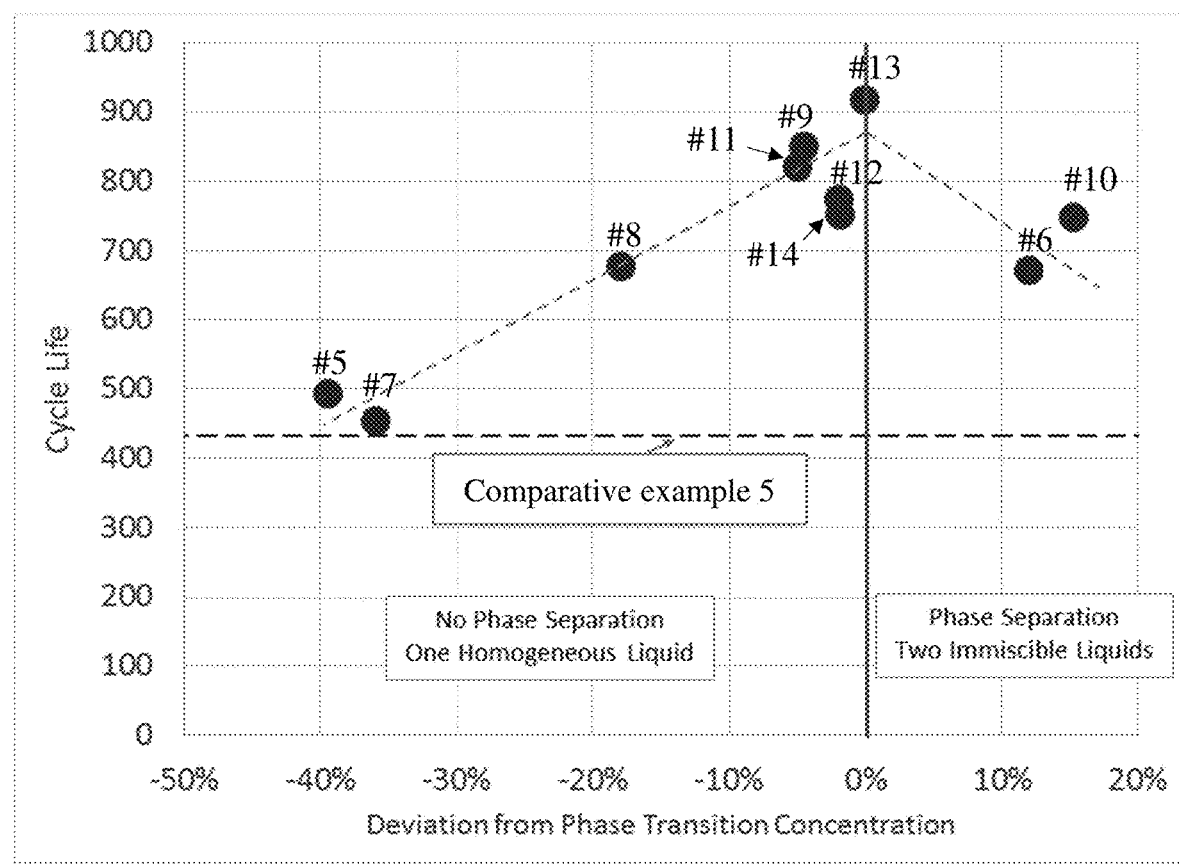
FIG. 7 is a graph illustrating the cycle life of electrochemical cells comprising various electrolyte compositions as a function of a % deviation of an existing concentration of aromatic hydrocarbon in the electrolyte away from a measured critical concentration of aromatic hydrocarbon in the electrolyte that leads to a phase separation of the electrolyte from one-phase to two-phase, in accordance with some embodiments.

A graph of cycle life versus deviation from critical amount of aromatic hydrocarbon that induced phase transition was plotted in FIG. 7. Each data point was labeled with the corresponding example number for Examples 5-14.

Experimental data showed that electrolyte systems with potential immiscibility (i.e., a critical amount of aromatic hydrocarbon that may induce phase separation) delivered enhance cycle life. For instance, the highest cycle life was delivered when the deviation from the phase transition concentration was minimal. For instance, an optimal cycle life of 918 was observed in Example 13, where the amount of aromatic hydrocarbon deviates only −0.1 wt % from the critical amount of aromatic hydrocarbon. Accordingly, as the amount of aromatic hydrocarbon deviated further from the critical amount, a relatively lower cycle life was observed (FIG. 7). This trend was observed for both negative and positive deviations.

Improved cycle lifetime was observed from 0% to 20-40% deviation. Beyond 40% deviation, a substantial cycle life improvement was not observed when compared with an electrolyte system without aromatic hydrocarbon solvent (Comparative Example 5). It should be noted that this deviation could be negative or positive, and improvement in cycle life was observed for both negative and positive deviations from 0% to 20%-40%. In some cases, negative deviation may be more practical, because the starting electrolyte was homogeneous and may serve better for uniform distribution during cell filling. Positive deviation meant that the starting electrolyte is already a two layered system and different techniques may be needed for uniform cell filling. Techniques that may enable filling of a two-layer electrolyte may involve various electrolyte system mechanical agitations from intense shaking to ultrasonic treatment. These and/or other techniques may lead to the formation of fine two-liquid emulsions.

Effect of Aromatic Hydrocarbons on Electrolyte Degradation

The effect of aromatic hydrocarbons on electrolyte degradation was analyzed by comparing the electrolyte composition after cycling of the cell in Example 9 (which contained TFT) to an electrolyte without any aromatic hydrocarbon solvent, e.g., as in Comparative Example 5.

Cells with electrolyte from Example 9 and Comparative Example 5 were disassembled at fresh state and at End of Life (EOL). During disassembling, electrolyte was extracted and analyzed with an NMR technique. More particularly, integrated 1H NMR spectra of three solvents were acquired: FEC, DMC and TFT. These integrated spectra gave solvent ratios in the electrolytes for cycled and fresh cells. Table 7 represents solvents relative content in the fresh and cycled cells.

Electrolyte composition analysis after cell cycling showed that electrolyte systems comprising an aromatic hydrocarbon solvent having a potential immiscibility led to lower rate of solvent decomposition (depletion) during cell cycling. Data in Table 7 showed that FEC, the most unstable solvent, completely depleted at EOL in the cell comprising an electrolyte in Comparative Example 5 (without any aromatic hydrocarbon solvent). On another hand, the electrolyte in Example 9 comprising an aromatic hydrocarbon (TFT) led to a lower degree of FEC depletion despite of substantially longer cycle life.

TABLE 7

Solvent relative content in the fresh and cycled cells

| State of Cycling | Solvent relative content | | |
|---|---|---|---|
| | TFT | FEC | DMC |
| Comparative Example 5, Fresh state | N/A | 0.200 | 0.800 |
| Comparative Example 5, End of life | N/A | 0.000 | 1.000 |
| Example 9, Fresh state | 0.406 | 0.364 | 0.230 |
| Example 9, End of life | 0.425 | 0.218 | 0.357 |

Figure 8:
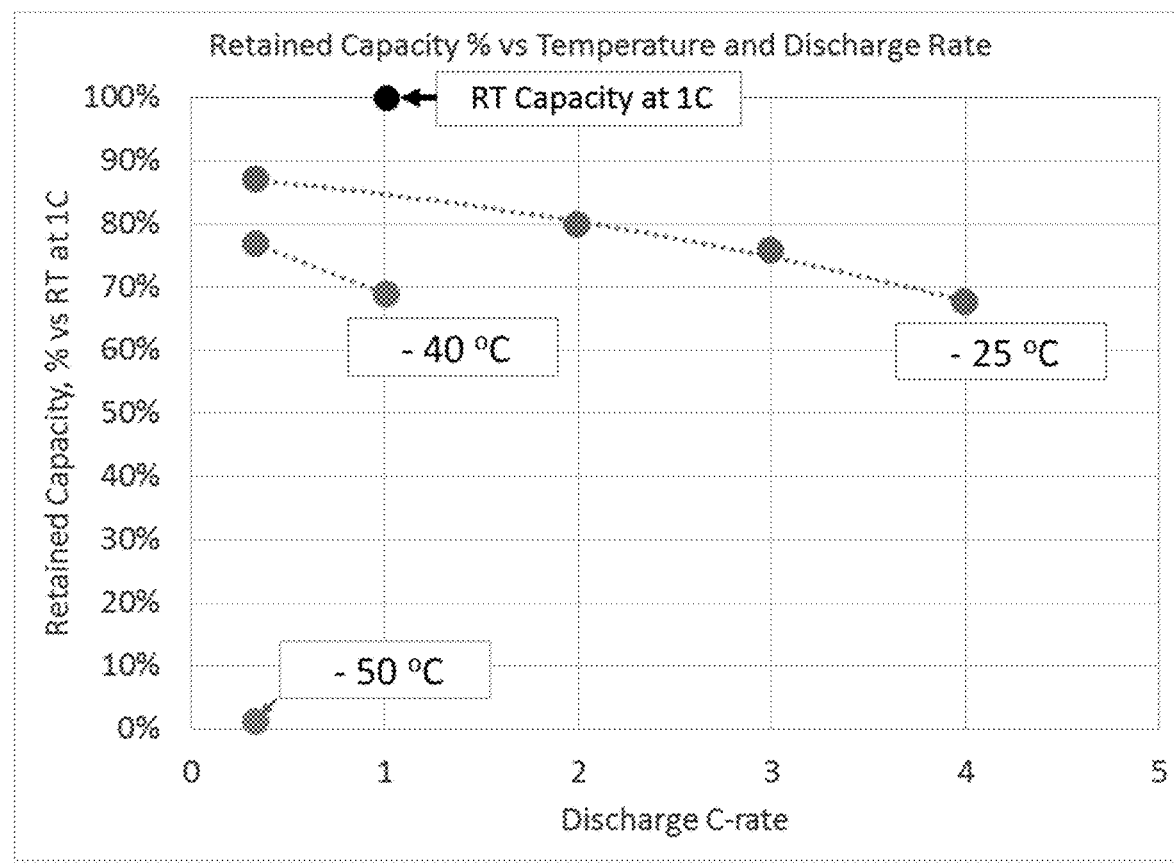
FIG. 8 is a graph showing the retained capacities of electrochemical cells as a function of temperature and discharge rates, in accordance with various embodiments.

Effect of Aromatic Hydrocarbon on Low Temperature Performance of Electrochemical Cell Cells containing the electrolyte composition of Example 9 were tested to analyze the effect of electrolyte comprising an aromatic hydrocarbon solvent on retaining charge capacity at low temperatures. The cell from Example 9 was charged at room temperature and discharged at −25° C. and −40° C. Corresponding applied discharge currents were in the range from C/3 to 4 C rates. 1 C rate corresponded to a current that was equal to the electrochemical cell's nominal capacity. A graph of % retained capacity vs. discharge rate at various low temperatures is shown in FIG. 8 for the electrolyte in Example 9. A comparative electrolyte from Comparative Example 5 was subjected to the same testing. The comparative electrolyte started to freeze below −10° C. and the cell did not work at −25° C.

As shown in FIG. 8, the cell containing electrolyte from Example 9 showed outstanding performance at low temperature (e.g., −25° C., −40° C.) and fast charge conditions.

Effect of Aromatic Hydrocarbon on Fast Charge of Electrochemical Cell

The cell containing electrolyte composition of Example 9 was subjected to 4C rate charge from zero state of charge (SOC) to 100% SOC (15 min charge duration, 480 mA) and discharged at 300 mA. A charge efficiency at fast charge of 99.7% was achieved and the cell retained this efficiency for over 80 cycles.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:
1. An electrolyte for a lithium battery, comprising:
   a lithium salt;
   an organic solvent comprising fluoroethylene carbonate at a concentration greater than 10% by weight of the electrolyte; and
   an aromatic hydrocarbon solvent that is different from the organic solvent, wherein the aromatic hydrocarbon solvent has a formula (I):

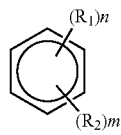

wherein, $R_1$ and $R_2$ can be the same or different and each is independently selected from hydrogen; halogen; unsubstituted, branched or unbranched aliphatic; substituted or unsubstituted, branched or unbranched haloaliphatic; substituted or unsubstituted, branched or unbranched haloheteroaliphatic; substituted or unsubstituted aryl; substituted or unsubstituted haloaryl; substituted or unsubstituted haloheteroaryl; wherein $R_1$ and/or $R_2$ can be substituted, branched or unbranched aliphatic when $R_1$ and $R_2$ are different and are not hydrogen or a nitro group;
   wherein n and m are integers from 0 to 6, with $n+m \leq 6$;
   wherein the aromatic hydrocarbon solvent is present at an amount that deviates no more than 20 wt % with respect to a critical amount of aromatic hydrocarbon solvent in the electrolyte;
   wherein the critical amount of aromatic hydrocarbon solvent in the electrolyte is an amount at which the electrolyte phase separates from a single liquid phase into at least two liquid phases.

2. An electrolyte as in claim 1, wherein $R_1$ and/or $R_2$ is $C_1$-$C_{10}$ alkyl.

3. An electrolyte as in claim 1, wherein $R_1$ and/or $R_2$ is $C_1$-$C_{10}$ haloalkyl.

4. An electrolyte as in claim 1, wherein $R_1$ and/or $R_2$ comprises one or more of fluorine, bromine, chlorine, and iodine.

5. An electrolyte as in claim 1, wherein $R_1$ and/or $R_2$ is an alkoxy group when $R_1$ and $R_2$ are different and are not hydrogen or a nitro group.

6. An electrolyte as in claim 1, wherein the aromatic hydrocarbon solvent of formula (I) comprises one or more of benzene, fluorobenzene, tert-butylbenzene, toluene, α, α, α-trifluorotoluene, difluorobenzene, trifluorobenzene, tetrafluorobenzene, and fluorotoluene.

7. An electrolyte as in claim 1, wherein the aromatic hydrocarbon solvent is present at an amount close to phase separation with the organic solvent.

8. An electrolyte as in claim 1, wherein the aromatic hydrocarbon of formula (I) comprises a lithium salt solubility of less than or equal to 5 wt %.

9. An electrolyte as in claim 1, wherein an increase in salt concentration during charge or discharge at a location adjacent the cathode or anode of an electrochemical cell results in a separation of the aromatic hydrocarbon solvent from the organic solvent at the location adjacent the cathode or anode.

10. An electrolyte for a lithium battery, comprising:
    a lithium salt;
    an organic solvent comprising a mixture of fluoroethylene carbonate and dimethyl carbonate; and
    an aromatic hydrocarbon solvent that is different from the organic solvent, wherein the aromatic hydrocarbon solvent is present at an amount that deviates no more than 20 wt % with respect to a critical amount of aromatic hydrocarbon solvent in the electrolyte, and wherein the critical amount of aromatic hydrocarbon solvent in the electrolyte is an amount at which the electrolyte phase separates from a single liquid phase into at least two liquid phases.

11. An electrolyte as in claim 10, wherein the organic solvent further comprises one or more of a carbonate-based solvent, a sulfone-based solvent, an ester of carboxylic acid, an ester of phosphoric acid, a linear or cyclic ether, and an acetal.

12. An electrolyte as in claim 11, wherein the organic solvent further comprises the carbonate-based solvent, and the carbonate-based solvent comprises one or more of diethyl carbonate, ethyl methyl carbonate, propylene carbonate, and ethylene carbonate.

13. An electrolyte as in claim 10, wherein the fluoroethylene carbonate is present in an amount of at least 10 wt % of a total weight of the electrolyte.

14. An electrolyte as in claim 10, wherein the aromatic hydrocarbon solvent is present in an amount of at least 12 wt % of a total weight of the electrolyte.

15. An electrolyte as in claim 10, wherein the organic solvent and the aromatic hydrocarbon has an organic solvent to the aromatic hydrocarbon solvent ratio of greater than or equal to 20 wt %:80 wt % and less than or equal to 99.5 wt %:0.5 wt %.

16. An electrolyte as in claim 10, wherein the lithium salt comprises one or more of lithium hexafluorophosphate, lithium bis(fluorosulfonyl)imide, lithium perchlorate, lithium hexafluoroarsenate, lithium tetrafluoroborate, lithium trifluromethanesulfonate, and lithium bis(trifluoromethanesulfonyl)imide.

17. An electrolyte as in claim 10, wherein the lithium salt has a solubility in the organic solvent that is at least 10 times the solubility in the aromatic hydrocarbon solvent.

18. An electrolyte as in claim 10, wherein the organic solvent comprises fluoroethylene carbonate in an amount of at least 12 wt % of a total weight of the electrolyte.

19. An electrolyte as in claim 10, wherein the aromatic hydrocarbon solvent is present at an amount that deviates no more than 10 wt % with respect to the critical amount of aromatic hydrocarbon solvent in the electrolyte.

20. An electrolyte as in claim 10, wherein the aromatic hydrocarbon solvent is present at an amount that deviates no more than 5 wt % with respect to the critical amount of aromatic hydrocarbon solvent in the electrolyte.

21. An electrolyte for a lithium battery, comprising:
a lithium salt;
an organic solvent comprising fluoroethylene carbonate in an amount of at least 10 wt % of a total weight of the electrolyte; and
an aromatic hydrocarbon solvent that is different from the organic solvent, wherein the aromatic hydrocarbon solvent is present at an amount that deviates no more than 20 wt % with respect to a critical amount of aromatic hydrocarbon solvent in the electrolyte, and wherein the critical amount of aromatic hydrocarbon solvent in the electrolyte is an amount at which the electrolyte phase separates from a single liquid phase into at least two liquid phases.

22. An electrolyte as in claim 21, wherein the aromatic hydrocarbon solvent is present in an amount of at least 12 wt % of a total weight of the electrolyte.

\* \* \* \* \*